United States Patent
Kobayashi

(10) Patent No.: US 7,478,363 B2
(45) Date of Patent: Jan. 13, 2009

(54) METHOD FOR TRANSLATING A GIVEN SOURCE PROGRAM INTO AN OBJECT PROGRAM CONTAINING COMPUTING EXPRESSIONS

(75) Inventor: Shiro Kobayashi, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 551 days.

(21) Appl. No.: 10/489,815

(22) PCT Filed: Sep. 17, 2002

(86) PCT No.: PCT/JP02/09508

§ 371 (c)(1),
(2), (4) Date: Mar. 17, 2004

(87) PCT Pub. No.: WO03/032157

PCT Pub. Date: Apr. 17, 2003

(65) Prior Publication Data

US 2004/0255284 A1    Dec. 16, 2004

(30) Foreign Application Priority Data

Sep. 18, 2001    (JP) .............................. 2001-283923

(51) Int. Cl.
G06F 9/44    (2006.01)
G06F 9/45    (2006.01)
(52) U.S. Cl. ....................................... 717/106; 717/140
(58) Field of Classification Search ......... 717/140–147, 717/106
See application file for complete search history.

(56) References Cited

U.S. PATENT DOCUMENTS

| | | | |
|---|---|---|---|
| 4,805,121 A | * | 2/1989 | Scott et al. ................... 345/421 |
| 5,442,790 A | | 8/1995 | Nosenchuck et al. |
| 5,524,244 A | * | 6/1996 | Robinson et al. ............. 717/140 |
| 5,819,097 A | * | 10/1998 | Brooks et al. ................ 717/141 |
| 6,161,217 A | | 12/2000 | Detlefs et al. |

(Continued)

FOREIGN PATENT DOCUMENTS

EP    1 094 401 B1    5/2005

(Continued)

OTHER PUBLICATIONS

Omuro, Mano, "Speech Coding Software DualSpeech", NTT R&D, Vo. 47, No. 5, (Japan), The Telecommunications Association, pp. 549-554, (1998).

(Continued)

Primary Examiner—Wei Y Zhen
Assistant Examiner—Chih-Ching Chow
(74) Attorney, Agent, or Firm—Finnegan, Henderson, Farabow, Garrett & Dunner, L.L.P.

(57) ABSTRACT

A compiler capable of facilitating calculation description in a source program and simplifying the source program description so as to reduce generation of bugs in calculation according to the block floating method by software. When a source program is given with description of calculation formula performing addition is extracted from the source program. A portion related to an addition in the extracted calculation formula is expanded as an instruction code constituting the processing performing addition using a data block corresponding to a plurality of block floating variables to be added. The expanded instruction code is embedded in an object program, thus creating and outputting an object program.

11 Claims, 13 Drawing Sheets

U.S. PATENT DOCUMENTS

| | | | |
|---|---|---|---|
| 6,247,174 B1* | 6/2001 | Santhanam et al. | 717/154 |
| 6,438,745 B1* | 8/2002 | Kanamaru et al. | 717/137 |
| 6,625,806 B1* | 9/2003 | Ono et al. | 717/136 |
| 6,728,739 B1 | 4/2004 | Kobayashi et al. | |
| 6,728,951 B1* | 4/2004 | Gibson et al. | 717/140 |
| 6,748,587 B1* | 6/2004 | Santhanam et al. | 717/140 |
| 6,951,014 B1* | 9/2005 | Sokolov | 717/139 |
| 6,966,056 B2* | 11/2005 | Kawaguchi | 717/152 |
| 7,185,324 B2* | 2/2007 | Michimoto et al. | 717/140 |
| 2002/0035589 A1* | 3/2002 | Saulsbury et al. | 708/700 |

FOREIGN PATENT DOCUMENTS

| | | |
|---|---|---|
| JP | 04-184624 A | 7/1992 |
| JP | 06-232757 A | 8/1994 |
| JP | 07-325710 A | 12/1995 |

OTHER PUBLICATIONS

Yamamoto, Shirokura, "C++ Introduction, Try the C++, No. 4", C Magazine, vol. 10, No. 4, (Japan) Softbank Corp., pp. 110-117, (1992).

Muruta, Nishitani, "Signal Processor and Application Thereof", first edition, (Japan), Shokodo Co., Ltd., ISBN: 4-7856-2005-6, pp. 27-38, (1988).

Shiro Kobayashi et al., "A Block-Floating-Point System for Multiple Datapath DSP," *Signal Processing Systems,* (1998), pp. 427-436, XP010303712.

Masahiro Kato, et al., "Write Everything in High-Class Language. Information Processing and Signal Processing Aggregation." Nikkei Electronics, Aug. 23, 1999 (No. 750), pp. 297-303.

Hideo Wada, "New Fortran 90," Information Processing, vol. 36, No. 4, Apr. 15, 1995, pp. 297-303.

Koichiro Hotta, et al., "Complete Reference to Fortran 90 and Optimizing the Array Operation by a Loop Fusion," Nikkei Electronics, Nov. 20, 1995 (No. 649), pp. 141-153.

Shuji Urano, "Introduction to C++ Programming First Session," ASCII, vol. 14, #1 Jan. 1, 1990, pp. 370-375.

* cited by examiner

FIG. 6

```
mul_blocks_bfp_bfp_bfp.c
```

```
define NUM_SAMPLE 8          ~S400 bfloat a[NUM_SAMPLE];
bfloat b[NUM_SAMPLE];
bfloat c[NUM_SAMPLE];         ~S402
bfloat r[NUM_SAMPLE];

int mul_blocks(void)
{
    unsigned int i;           ~S404
    for(i=0;i<NUM_SAMPLE;i++)
        r[i]=a[i]*b[i];       ~S406 for(i=0;i<NUM_SAMPLE;i++)
        r[i]=r[i]*c[i];       ~S408 exit(0);                  ~S410
}
```

*FIG. 7*

```
                    mul_blocks_bfp_bfp_bfp.asm
define NUM_SAMPLE 8   ~S500 global word_t a[NUM_SAMPLE];
global sf_t   a_sfb;
global word_t b[NUM_SAMPLE];
global sf_t   b_sfb;
global word_t c[NUM_SAMPLE];     ~S502
global sf_t   c_sfb;
global word_t r[NUM_SAMPLE];
global sf_t   r_sfb;

void mul_blocks_bfp_bfp_bfp(void)
{
   M0=0;
   M1=1;   ~S504    S506

SFB0=load_sf(a_sfb);   // LOAD BSF (a_sfb) OF a[] INTO SFB0 REGISTER
   SFB1=load_sf(b_sfb);   // LOAD BSF (b_sfb) OF b[] INTO SFB1 REGISTER
   SFB2=SFB0+SFB1;        // CALCULATE BSF BASED ON ENTERED PRODUCT OF a[]*b[]
   reset_sfb(SFB3);       // INITIALIZE BSF SEARCH OF MULTIPLICATION RESULTS OF a[]*b[]
                  S508
   P0=&a[0];   // SET POINTER TO a[]
   P1=&b[0];   // SET POINTER TO b[]
   P2=&r[0];   // SET POINTER TO r'[]

loop(NUM_SAMPLE)                          ~S510
   {
      RA=bfp_load_man(*P0++M1,SFB0);   // LOAD DATA FROM a[]
      RB=bfp_load_man(*P1++M1,SFB1);   // LOAD DATA FROM b[]
      RX=RA*RB;   // MULTIPLICATION
      {*P2++M1 || SFB3}=bfp_store_man(RX,SFB2);   // STORE COMPUTED RESULTS IN r'[]
   } r_sfb=store_sf(SFB3);   // STORE BSF OF r'[]  ~S512

SFB0=load_sf(r_sfb);   // LOAD BSF (r_sfb) OF r'[] INTO SFB0 REGISTER
   SFB1=load_sf(c_sfb);   // LOAD BSF (c_sfb) OF c[] INTO SFB1 REGISTER
   SFB2=SFB0+SFB1;   S514   // CALCULATE BSF BASED ON ENTERED PRODUCT OF r'[]*c[]
   reset_sfb(SFB3);       // INITIALIZE BSF SEARCH OF MULTIPLICATION RESULTS OF r'[]*c[]
                 S516
   P0=&r[0];   // SET POINTER TO r'[]
   P1=&c[0];   // SET POINTER TO c[]
   P2=&r[0];   // SET POINTER TO r[]

loop(NUM_SAMPLE)                          ~S518
   {
      RA=bfp_load_man(*P0++M1,SFB0);   // LOAD DATA FROM r'[]
      RB=bfp_load_man(*P1++M1,SFB1);   // LOAD DATA FROM c[]
      RX=RA*RB;   // MULTIPLICATION
      {*P2++M1 || SFB3}=bfp_store_man(RX,SFB2);   // STORE COMPUTED RESULTS IN r[]
   } r_sfb=store_sf(SFB3);   // STORE BSF OF r[] ~S520
}
```

FIG. 8

```
mul_blocks_bfp_fxp_bfp.c
```

```
define NUM_SAMPLE 8                    ~S600 bfloat a[NUM_SAMPLE];
bfloat b[NUM_SAMPLE];
fixed  c[NUM_SAMPLE];                   ~S602
bfloat r[NUM_SAMPLE];

int mul_blocks(void)
{
    unsigned int i;                     ~S604
    for(i=0;i<NUM_SAMPLE;i++)
        r[i]=a[i]*b[i];                 ~S606 for(i=0;i<NUM_SAMPLE;i++)
        r[i]=r[i]*c[i];                 ~S608 exit(0);                            ~S610
}
```

FIG. 9

```
                                          mul_blocks_bfp_fxp_bfp.asm
define NUM_SAMPLE 8   ~S700 global word_t a[NUM_SAMPLE];
global sf_t   a_sfb;
global word_t b[NUM_SAMPLE];
global sf_t   b_sfb;                   ~S702
global word_t c[NUM_SAMPLE];
global word_t r[NUM_SAMPLE];
global sf_t   r_sfb;

void mul_blocks_bfp_fxp_bfp(void)
{
    M0=0;    ~S704
    M1=1;          ,S706
    SFB0=load_sf(a_sfb);    // LOAD BSF (a_sfb) OF a[] INTO SFB0 REGISTER
    SFB1=load_sf(b_sfb);    // LOAD BSF (b_sfb) OF b[] INTO SFB1 REGISTER
    SFB2=SFB0+SFB1;         // CALCULATE BSF BASED ON ENTERED PRODUCT OF a[]*b[]
    reset_sfb(SFB3);        // INITIALIZE BSF SEARCH OF MULTIPLICATION RESULTS OF a[]*b[]
                 S708
    P0=&a[0];    // SET POINTER TO a[]
    P1=&b[0];    // SET POINTER TO b[]
    P2=&r[0];    // SET POINTER TO r'[]

loop(NUM_SAMPLE)                    ~S710
    {
        RA=bfp_load_man(*P0++M1,SFB0);   // LOAD DATA FROM a[]
        RB=bfp_load_man(*P1++M1,SFB1);   // LOAD DATA FROM b[]

RX=RA*RB;   // MULTIPLICATION

{*P2++M1 || SFB3}=bfp_store_man(RX,SFB2);  // STORE COMPUTED RESULTS IN r'[]
    }
                                             S712
    r_sfb=store_sf(SFB3);  // STORE BSF OF r'[]
                                      S714
    SFB0=load_sf(r_sfb);    // LOAD BSF (r_sfb) OF r'[] INTO SFB0 REGISTER
    reset_sfb(SFB3);        // INITIALIZE BSF SEARCH OF MULTIPLICATION RESULTS OF r'[]*c[]
                 S716
    P0=&r[0];    // SET POINTER TO r'[]
    P1=&c[0];    // SET POINTER TO c[]
    P2=&r[0];    // SET POINTER TO r[]

loop(NUM_SAMPLE)                    ~S718
    {
        RA=bfp_load_man(*P0++M1,SFB0);   // LOAD DATA FROM r'[]
        RB=load_man(*P1++M1);            // LOAD DATA FROM c[]

RX=RA*RB;   // MULTIPLICATION

{*P2++M1 || SFB3}=bfp_store_man(RX,SFB0);  // STORE COMPUTED RESULTS IN r[]
    }
    r_sfb=store_sf(SFB3);  // STORE BSF OF r[]  ~S720
}
```

FIG. 10

```
bfloat a[K+1];
bfloat b[N+1];              S800
bfloat r[N+1];

for(n=0;n<=N;n++)
{                                    S802
    r[n]=0.0;   S804
    for(k=0;k<=K;k++)
        r[n]+=a[k]*b[n-k];   S806
}
```

FIG. 12

```
fixed  a[K+1];
bfloat b[N+1];     — S900
bfloat r[N+1];
```

```
for(n=0;n<=N;n++)
{                                      — S902
    r[n]=0.0;   — S904
    for(k=0;k<=K;k++)
        r[n]+=a[k]*b[n-k];    — S906
}
```

METHOD FOR TRANSLATING A GIVEN SOURCE PROGRAM INTO AN OBJECT PROGRAM CONTAINING COMPUTING EXPRESSIONS

TECHNICAL FIELD

The present invention relates to an apparatus, program, and method which translate a source program into an object program. More particularly, it relates to a compiler apparatus, compiler program, and object program generating method which make it easy to describe arithmetic operations in source programs, make it simple to write source programs, and reduce bugs, when performing block floating-point operations in software.

BACKGROUND ART

Numeric representations in digital signal processing include fixed-point representation and floating-point representation.

In the floating-point representation, each data item has an exponent part and mantissa. This has the advantage of ensuring high accuracy and wide dynamic range, but has the problem of requiring complex, large-scale hardware. On the other hand, the fixed-point representation requires only simple hardware and small-scale circuits, but has the problem of low computational accuracy.

As a solution to the problem with the floating-point representation, a format called block floating-point has been proposed. This format treats a predetermined number (e.g., m) of data items as one data block, gives one block scale factor to each data block, and scales the m data items in the data block equally, thereby making effective use of a limited dynamic range and preventing deterioration in accuracy.

To implement block floating-point operations in software, a source program is written in a predetermined programming language (e.g., in the C language), the source program is translated into an object program using an appropriate compiler, and the object program is executed on a computer.

However, to implement block floating-point operations in software, it is necessary to organize one or more data items into a data group and organize two or more data groups into a data block, which handles a data structure that contains the group scale factors of individual data groups and the block scale factor of the data block. Thus, when writing a source program, the data structure must be defined as a structure. This means that a lot of preparation is required before describing block floating-point operations.

Also, defining a structure makes it possible to use structured data as a cohesive variable for arithmetic operations, but there are certain limits, and the structured data is useful only for simple substitutions or arithmetic operations among structure variables. The simple arithmetic operations here mean arithmetic operations among the same type of structure variables, i.e., among data in the same data group or among scale factors. To implement block floating-point operations, it is necessary to perform arithmetic operations by scaling data according to scale factors. Thus, simple arithmetic operations among structure variables are not enough and a unique function must be created for each type of arithmetic operation. Suppose, for example, functions bfp_add ($x.sub.1$, $x.sub.2$) are created to add data in two data blocks. To perform the arithmetic operation of Equation (1), structure variables must be nested as shown in Equation (2). A, B, and C in Equations (1) and (2) below are structure variables (objects) created in a source program according to a block floating-point data structure defined as a structure.

$$Y = A + B + C \quad (1)$$

$$Y = bfp.\text{sub.--add}(bfp.\text{sub.--add}(A,B),C) \quad (2)$$

This makes it cumbersome to write a source program and difficult to create a program which contain a small number of bugs.

Furthermore, to perform addition across two or more data blocks at the execution level of an object program, it is necessary to align digit places among the data blocks during the addition because the data in the data blocks have been scaled. For example, when adding data from two different data blocks, data A "0.1" with a group scale factor of "2" and data B "0.11" with a group scale factor of "3," data A is changed to "0.001" by a two-bits right shift and data B is changed to "0.00011" by a three-bits right shift before the addition. Then, the computational result is normalized again to finally obtain data "0.111" with a group scale factor of "2".

Thus, to perform addition across data blocks, the data items in each data block must be normalized, and then the data items must be normalized across the data blocks, complicating arithmetic processing. This causes such problems as increased computational load, decreased computing speed, and increase in the number of circuit element. The same is true for subtraction across two or more data blocks.

Furthermore, when performing multiplication-accumulation (arithmetic operations which involve adding multiplication results to obtain their total sum; the same applies hereinafter) across two or more data blocks at the execution level of an object program, specifically, for example, when multiplying data in data blocks A and B and adding data in data block C to the multiplication results, it is necessary to go through three processes: (1) multiplication of data in data blocks A and B, (2) digit place alignment (scaling) between the multiplication results and the data in data block C, and (3) addition of data in data block C to the multiplication results. However, for scaling after the multiplication, a longer bit length must be assigned to structured variables than during the multiplication to avoid cancellation of significant digits by scaling. This not only increases data capacity required for arithmetic operations, but also involves bit length conversion, which may lower computational efficiency.

The present invention has been made in view of unsolved problems with conventional techniques such as those described above. Its first object is to provide a compiler apparatus, compiler program, and object program generating method which make it easy to describe arithmetic operations in source programs, make it simple to write source programs, and reduce bugs, when performing block floating-point operations in software. Its second object is to provide a compiler apparatus, compiler program, and object program generating method which simplify arithmetic processing when performing addition or subtraction in block floating-point format using software. Its third object is to provide a compiler apparatus, compiler program, and object program generating method which decrease data capacity required for arithmetic operations and improve computational efficiency when performing multiplication-accumulation in block floating-point format using software.

DISCLOSURE OF THE INVENTION

To achieve the above objects, an embodiment of the present invention sets forth a compiler apparatus which handles block floating-point variables.

With this configuration, the compiler apparatus handles block floating-point variables in compilation.

Further, the present invention sets forth an embodiment of the compiler apparatus, characterized by generating such instruction codes as to: calculate an operational block scale factor based on a computing expression and on information about operand of the computing expression; and perform a shifting process based on the operational block scale factor and on block scale factors and feed data to a computing unit, in the case of block floating-point variables.

With this configuration, the compiler apparatus generate such instruction codes as to calculate an operational block scale factor based on a computing expression and on information about operand of the computing expression; and perform a shifting process based on the operational block scale factor and on block scale factors and feed data to a computing unit, in the case of block floating-point variables.

The present invention further sets forth an embodiment of the compiler apparatus, characterized by generating such instruction codes as to: calculate an interim scale factor based on a computing expression and on information about operand of the computing expression; and normalize computational results and calculate block scale factors based on updated group scale factors updated as a result of the normalization and on the interim scale factor, in the case of block floating-point output variables.

With this configuration, the compiler apparatus generates such instruction codes as to calculate an interim scale factor based on a computing expression and on information about operand of the computing expression; and normalize computational results and calculate block scale factors based on updated group scale factors updated as a result of the normalization and on the interim scale factor, in the case of block floating-point output variables.

Another embodiment of the present invention sets forth a compiler apparatus which handles hierarchical block floating-point variables.

With this configuration, the compiler apparatus handles hierarchical block floating-point variables in compilation.

Another embodiment of the present invention sets forth the compiler apparatus, characterized by generating such instruction codes as to: calculate an operational block scale factor based on a computing expression and on information about operand of the computing expression; and perform a shifting process based on the operational block scale factor, block scale factors, and group scale factors and feed data to a computing unit, in the case of hierarchical block floating-point variables.

With this configuration, the compiler apparatus generates such instruction codes as to calculate an operational block scale factor based on a computing expression and on information about operand of the computing expression; and perform a shifting process based on the operational block scale factor, block scale factors, and group scale factors and feed data to a computing unit, in the case of hierarchical block floating-point variables.

Another embodiment of the present invention sets forth the compiler apparatus, characterized by generating such instruction codes as to: calculate an interim scale factor based on a computing expression and on information about operand of the computing expression; and in the case of hierarchical block floating-point output variables, group-normalize computational results, calculate final group scale factors based on the group scale factors updated as a result of the group normalization and on the interim scale factor, and calculate a block scale factor from the calculated group scale factors.

With this configuration, the compiler apparatus generates such instruction codes as to calculate an interim scale factor based on a computing expression and on information about operand of the computing expression; and in the case of hierarchical block floating-point output variables, group-normalize computational results, calculate final group scale factors based on the group scale factors updated as a result of the group normalization and on the interim scale factor, and calculate a block scale factor from the calculated group scale factors.

Another embodiment of the present invention sets forth a compiler apparatus which handles block floating-point variables, characterized by generating such instruction codes, in the case of multiplication or division, as to calculate a block scale factor of multiplication results based on block scale factors of block floating-point variables.

With this configuration, the compiler apparatus generates such instruction codes, in the case of multiplication or division, as to calculate a block scale factor of multiplication results based on block scale factors of block floating-point variables.

Another embodiment of the present invention sets forth a compiler apparatus which handles block floating-point variables and fixed-point variables, characterized by generating such instruction codes, in the case of multiplication or division, as to calculate a block scale factor of multiplication results based on block scale factors of block floating-point variables.

With this configuration, the compiler apparatus generates such instruction codes, in the case of multiplication or division, as to calculate a block scale factor of multiplication results based on block scale factors of block floating-point variables.

Another embodiment of the present invention sets forth a compiler apparatus which handles hierarchical block floating-point variables, characterized by generating such instruction codes, in the case of multiplication or division, as to calculate block scale factors of computational results based on block scale factors of hierarchical block floating-point variables.

With this configuration, the compiler apparatus generates such instruction codes, in the case of multiplication or division, as to calculate block scale factors of computational results based on block scale factors of hierarchical block floating-point variables.

Another embodiment of the present invention sets forth a compiler apparatus which handles block floating-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

With this configuration, the compiler apparatus generates such instruction codes, in the case of addition or subtraction, as to select a common block scale factor based on comparison of block scale factors of block floating-point variables; scale data in data blocks based on the common scale factor; and perform addition or subtraction on the scaled data.

Another embodiment of the present invention sets forth a compiler apparatus which handles block floating-point variables and fixed-point variables, characterized by generating such instruction codes, in the case of addition or subtraction, as to select a common block scale factor based on comparison between a block scale factor of a block floating-point variable and a virtual block scale factor of a fixed-point variable given by a constant; scale data in data blocks based on the common scale factor; and perform addition or subtraction on the scaled data.

With this configuration, the compiler apparatus generates such instruction codes, in the case of addition or subtraction, as to select a common block scale factor based on comparison between a block scale factor of a block floating-point variable and a virtual block scale factor of a fixed-point variable given by a constant; scale data in data blocks based on the common scale factor; and perform addition or subtraction on the scaled data.

Another embodiment of the present invention sets forth a compiler apparatus which handles hierarchical block floating-point variables, characterized by generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

With this configuration, the compiler apparatus generates such instruction codes, in the case of addition or subtraction, as to select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth a compiler apparatus which handles block floating-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

With this configuration, the compiler apparatus generates such instruction codes, in the case of addition or subtraction, as to select a common block scale factor based on comparison of block scale factors of block floating-point variables; scale data in data blocks based on the common scale factor; and perform addition or subtraction on the scaled data.

Another embodiment of the present invention sets forth a compiler apparatus which handles block floating-point variables and fixed-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

With this configuration, the compiler apparatus generates such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth a compiler apparatus which handles hierarchical block floating-point variables, characterized by generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

With this configuration, the compiler apparatus generates such instruction codes, in the case of addition or subtraction, as to select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth a compiler apparatus which handles block floating-point variables, characterized by: performing arithmetic operations on block floating variables to be subjected to multiplication out of multiplication-accumulation, accumulating multiplication results to complete multiplication-accumulation, producing the computational result as a computational-result data block, and calculating a computational-result block scale factor based on block scale factors.

With this configuration, the compiler apparatus performs arithmetic operations on block floating variables to be subjected to multiplication out of multiplication-accumulation, accumulates multiplication results to complete multiplication-accumulation, produces the computational result as a computational-result data block, and calculates a computational-result block scale factor based on block scale factors.

Another embodiment of the present invention sets forth a compiler apparatus which handles block floating-point variables and fixed-point variables, characterized by: performing arithmetic operations on block floating variables and fixed-point variables to be subjected to multiplication out of multiplication-accumulation, accumulating multiplication results to complete multiplication-accumulation, producing the computational result as a computational-result data block, and calculating a computational-result block scale factor based on block scale factors.

With this configuration, the compiler apparatus performs arithmetic operations on block floating variables and fixed-point variables to be subjected to multiplication out of multiplication-accumulation, accumulates multiplication results to complete multiplication-accumulation, produces the computational result as a computational-result data block, and calculates a computational-result block scale factor based on block scale factors.

Another embodiment of the present invention sets forth a compiler apparatus which handles hierarchical block floating-point variables, characterized by: scaling data of hierarchical block floating variables to be subjected to multiplication out of multiplication-accumulation using a scale factor consisting of a difference between group scale factor and block scale factor, performing arithmetic operations on the scaled data, accumulating multiplication results to complete multiplication-accumulation, producing the computational result as a computational-result data block, and calculating a computational-result block scale factor based on block scale factors.

With this configuration, the compiler apparatus scales data of hierarchical block floating variables to be subjected to multiplication out of multiplication-accumulation using a scale factor consisting of a difference between group scale factor and block scale factor, performs arithmetic operations on the scaled data, accumulates multiplication results to complete multiplication-accumulation, produces the computational result as a computational-result data block, and calculates a computational-result block scale factor based on block scale factors.

Another embodiment of the present invention sets forth a compiler apparatus which translates a given source program into an object program when the source program contains computing expressions which are written using block floating variables of a Block Floating data type, characterized in that: each of the block floating variables constitutes a data block containing one or more data items and the data block is a variable which represents a data structure containing a block scale factor of the data block; and the compiler apparatus comprises computing expression detecting means for detecting the computing expressions in the source program, computing expression expanding means for expanding the computing expressions detected by the computing expression detecting means into predetermined instruction codes, and instruction code conversion means for converting the instruction codes produced by the computing expression expanding means into the object program.

With this configuration, given a source program containing computing expressions written using block floating variables, the computing expression detecting means detects the computing expressions in the source program, the computing expression expanding means expands the detected computing expressions into predetermined instruction codes, and the instruction code conversion means converts the produced instruction codes into an object program.

In some embodiments "if input operand contain block floating type data" means a situation in which there are two or more input operand to be operated upon and at least one of them is block floating type data.

Also, "if the input operand is block floating type data" means a situation in which there is one input operand to be operated upon (i.e., arithmetic operations are to be performed within the data block) and the input operand is of the Block Floating type.

Another embodiment of the present invention sets forth the compiler apparatus, characterized in that: the computing expression detecting means detects operators in the expressions, the data type of input operand for the operators, and the data type of output operand for the operators as detection results; and the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand if the input operand is block floating type data.

With this configuration, the computing expression detecting means detects operators in the expressions, the data type of input operand for the operators, and the data type of output operand for the operators as detection results. Then, the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand if the input operand is block floating type data.

Another embodiment of the present invention sets forth the compiler apparatus, characterized in that: the computing expression expanding means expands any block floating type data fed to a computing unit into instruction codes which specify a computational process based on the operators; and the computing expression expanding means produces instruction codes which specify a data output process for calculating an interim block scale factor from the block scale factors of input data blocks, normalizing computational results which correspond to an output operand, and calculating block scale factors from the interim block scale factor if the output operand is block floating type data.

With this configuration, the computing expression expanding means expands any block floating type data fed to a computing unit into instruction codes which specify a computational process based on the operators. If output operand are block floating type data, the computing expression expanding means produces instruction codes which specify a data output process for calculating an interim block scale factor from the block scale factors of input data blocks, normalizing computational results which correspond to the output operand, and calculating block scale factors from the interim block scale factor.

Another embodiment of the present invention sets forth a compiler apparatus which translates a given source program into an object program when the source program contains computing expressions which are written using block floating variables of a Block Floating data type, characterized in that: each of the block floating variables constitutes a data block containing one or more data groups, each of which in turn contains one or more data items and one group scale factor, the data block being a variable which represents a data structure containing a block scale factor of the data block; and the compiler apparatus comprises computing expression detecting means for detecting the computing expressions in the source program, computing expression expanding means for expanding the computing expressions detected by the computing expression detecting means into predetermined instruction codes, and instruction code conversion means for converting the instruction codes produced by the computing expression expanding means into the object program.

With this configuration, given a source program containing computing expressions written using block floating variables, the computing expression detecting means detects the computing expressions in the source program, the computing expression expanding means expands the detected computing expressions into predetermined instruction codes, and the instruction code conversion means converts the produced instruction codes into an object program.

In some embodiments "if input operand contain block floating type data" means a situation in which there are two or more input operand to be operated upon and at least one of them is block floating type data.

In some embodiments "if the input operand is block floating type data" means a situation in which there is one input operand to be operated upon (i.e., arithmetic operations are to be performed within the data block) and the input operand is of the Block Floating type.

Another embodiment of the present invention sets forth the compiler apparatus, characterized in that: the computing expression detecting means detects operators in the expressions, the data type of input operand for the operators, and the data type of output operand for the operators as detection results; and the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand as well as on the group scale factor if the input operand is block floating type data.

With this configuration, the computing expression detecting means detects operators in the expressions, the data type of input operand for the operators, and the data type of output operand for the operators as detection results. Then, the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand as well as on the group scale factor if the input operand is block floating type data.

Another embodiment of the present invention sets forth the compiler apparatus, characterized in that: the computing expression expanding means expands any block floating type data fed to a computing unit into instruction codes which specify a computational process based on the operators; and the computing expression expanding means produces instruction codes which specify a data output process for calculating an interim block scale factor from the block scale factors of input data blocks, group-normalizing computational results which correspond to an output operand, calculating final group scale factors based on either or both of updated group scale factors calculated as a result of the group normalization and/or the interim block scale factor, and calculating a block scale factor from the calculated group scale factors if the output operand is block floating type data.

With this configuration, the computing expression expanding means expands any block floating type data fed to a computing unit into instruction codes which specify a computational process based on the operators. If output operand are block floating type data, the computing expression expanding means produces instruction codes which specify a data output process for calculating an interim block scale factor from the block scale factors of input data blocks, group-normalizing computational results which correspond to the output operand, calculating final group scale factors based on either or both of updated group scale factors calculated as a result of the group normalization and/or the interim block scale factor, and calculating a block scale factor from the calculated group scale factors if the output operand is block floating type data.

Another embodiment of the present invention sets forth a compiler apparatus which translates a given source program into an object program when the source program contains computing expressions which are written using block floating variables, characterized in that: each of the block floating variables constitutes a data block containing one or more data items and the data block is a variable which represents a data structure containing a block scale factor of the data block; and the compiler apparatus comprises computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables to be subjected to multiplication or division; and the process specified by the instruction codes performs multiplication or division on data in the data blocks, produces the computational result as a computational-result data block, and calculates the block scale factor of the computational-result data block based on the block scale factors of the data blocks.

With this configuration, given a source program containing computing expressions written using block floating variables, the computing expression detecting means detects the computing expressions for multiplication or division in the source program, the computing expression expanding means expands that part of the detected computing expressions which involves multiplication or division into instruction codes which specify multiplication or division for data blocks corresponding to the block floating variables to be subjected to multiplication or division, and instruction code embedding means embeds the produced instruction codes in the object program.

Thus, when the object program is executed, in relation to that part of the computing expressions which involves multiplication or division, multiplication or division is performed on data in the data blocks. Then, the computational result is produced as a computational-result data block, and the block scale factor of the computational-result data block is calculated based on the block scale factors of the data blocks.

Examples of the scale factor here include a shift amount used to bit-shift data. In this case, scaling is performed by bit-shifting data by a shift amount equivalent to a given scale factor. This also applies to embodiments of the compiler apparatus.

Also, the object program may be an executable program containing instruction codes which can be executed directly by a processing unit such as a CPU or DSP (Digital Signal Processor) or an intermediate file such as a text file which represents a program written in a lower-level language than a language used for the source program. This also applies to embodiments of the compiler apparatus.

Also, the data blocks corresponding to the block floating variables to be subjected to multiplication or division may be two or more different data blocks or a single data block. That is, multiplication or division may be performed either across different data blocks or within the same data block. This also applies to embodiments of the compiler apparatus.

Another embodiment of the present invention sets forth a compiler apparatus which translates a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the compiler apparatus comprises computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables and fixed-point variables to be subjected to multiplication or division; and the process specified by the instruction codes performs multiplication or division on data in the data blocks which correspond to the block floating variables and data in the data blocks which correspond to the fixed-point variables, produces the computational result as a computational-result data block, and calculates the block scale factor of the computational-result data block based on the block scale factors of the data blocks which correspond to the block floating variables.

With this configuration, given a source program containing computing expressions written using block floating variables and fixed-point variables, the computing expression detecting means detects the computing expressions for multiplication or division in the source program, the computing expression expanding means expands that part of the detected computing expressions which involves multiplication or division into instruction codes which specify multiplication or division for data blocks corresponding to the block floating variables and fixed-point variables to be subjected to multiplication or division, and instruction code embedding means embeds the produced instruction codes in the object program.

Thus, when the object program is executed, in relation to that part of the computing expressions which involves multiplication or division, multiplication or division is performed on data in the data blocks which correspond to the block floating variables and data in the data blocks which correspond to the fixed-point variables. Then, the computational result is produced as a computational-result data block, and the block scale factor of the computational-result data block is calculated based on the block scale factors of the data blocks which correspond to the block floating variables.

Another embodiment of the present invention sets forth a compiler apparatus which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the compiler apparatus comprises computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables to be subjected to multiplication or division; and the process specified by the instruction codes performs multiplication or division on data in each data group of the data block, produces the computational result as a computational-result data block, and calculates the block scale factor of the computational-result data block based on the block scale factor of the data block.

With this configuration, given a source program containing computing expressions written using block floating variables, the computing expression detecting means detects the computing expressions for multiplication or division in the source program, the computing expression expanding means expands that part of the detected computing expressions which involves multiplication or division into instruction codes which specify multiplication or division for data blocks corresponding to the block floating variables to be subjected to multiplication or division, and instruction code embedding means embeds the produced instruction codes in the object program.

Thus, when the object program is executed, in relation to that part of the computing expressions which involves multiplication or division, multiplication or division is performed on each data in the data blocks. Then, the computational result is produced as a computational-result data block, and the block scale factor of the computational-result data block is calculated based on the block scale factors of the data blocks.

Another embodiment of the present invention sets forth a compiler apparatus which translates a given source program into an object program when the source program contains computing expressions which are written using block floating variables, characterized in that: each of the block floating variables constitutes a data block containing one or more data items and the data block is a variable which represents a data structure containing a block scale factor of the data block; the compiler apparatus comprises computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data blocks based on the common block scale factor, and performs addition or subtraction on the scaled data in the data blocks.

With this configuration, given a source program containing computing expressions written using block floating variables, the computing expression detecting means detects the computing expressions for addition or subtraction in the source program, the computing expression expanding means expands that part of the detected computing expressions which involves addition or subtraction into instruction codes which specify addition or subtraction for data blocks corresponding to the block floating variables to be subjected to addition or subtraction, and instruction code embedding means embeds the produced instruction codes in the object program.

Thus, when the object program is executed, the block scale factor of the data block containing data with the maximum absolute value is selected as a common block scale factor in relation to that part of the computing expressions which involves addition or subtraction. Then, data in the data blocks is scaled based on the common block scale factor and addition or subtraction is performed on the scaled data in the data blocks.

Also, the data blocks corresponding to the block floating variables to be subjected to addition or subtraction may be two or more different data blocks or a single data block. That is, addition or subtraction may be performed either across different data blocks or within the same data block. This also applies to embodiments of the compiler apparatus, the compiler programs, and object program generating methods.

Another embodiment of the present invention sets forth a compiler apparatus which translates a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the compiler apparatus comprises computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables and fixed-point variables to be subjected to addition or subtraction; and the process specified by the instruction codes calculates a virtual block scale factor of fixed-point data blocks as a constant, selects the block scale factor of the data block containing data with the maximum absolute value as a common block scale factor from among the block scale factors of the data blocks which correspond to the block floating variables and the virtual block scale factor, scales data in the data blocks based on the common block scale factor, and performs addition or subtraction on the scaled data in the data blocks and data in the data blocks which correspond to the fixed-point variables.

With this configuration, given a source program containing computing expressions written using block floating variables and fixed-point variables, the computing expression detecting means detects the computing expressions for addition or subtraction in the source program, the computing expression expanding means expands that part of the detected computing expressions which involves addition or subtraction into instruction codes which specify addition or subtraction for data blocks corresponding to the block floating variables and fixed-point variables to be subjected to addition or subtraction, and instruction code embedding means embeds the produced instruction codes in the object program.

Thus, when the object program is executed, in relation to that part of the computing expressions which involves addition or subtraction, a virtual block scale factor given as a constant is calculated for fixed-point data blocks, the block scale factor of the data block containing data with the maximum absolute value as a common block scale factor is selected from among the block scale factors of the data blocks which correspond to the block floating variables and the virtual block scale factor, data in the data blocks are scaled based on the common block scale factor. Then, addition or subtraction is performed on the scaled data in the data blocks and data in the data blocks which correspond to the fixed-point variables.

Another embodiment of the present invention sets forth a compiler apparatus which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the compiler apparatus comprises computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data groups in each data block based on scale factors consisting of differences between the group scale factors of the respective data groups and the common block scale factor, and performs addition or subtraction on the scaled data in the data blocks.

With this configuration, given a source program containing computing expressions written using block floating variables, the computing expression detecting means detects the computing expressions for addition or subtraction in the source program, the computing expression expanding means expands that part of the detected computing expressions which involves addition or subtraction into instruction codes which specify addition or subtraction for data blocks corresponding to the block floating variables to be subjected to addition or subtraction, and instruction code embedding means embeds the produced instruction codes in the object program.

Thus, when the object program is executed, the block scale factor of the data block containing data with the maximum absolute value is selected as a common block scale factor in relation to that part of the computing expressions which involves addition or subtraction. Then, data in the data groups in each data block are scaled based on scale factors consisting of differences between the group scale factors of the respective data groups and the common block scale factor, and addition or subtraction is performed on the scaled data in the data blocks.

Another embodiment of the present invention sets forth a compiler apparatus which translates a given source program into an object program when the source program contains computing expressions which are written using block floating variables, characterized in that: each of the block floating variables constitutes a data block containing one or more data items and the data block is a variable which represents a data structure containing a block scale factor of the data block; the compiler apparatus comprises computing expression detecting means for detecting the computing expressions for multiplication-accumulation in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, further calculates a corrective block scale factor which is a difference between a multiplication-result block scale factor and the block scale factor of the third data block, the multiplication-result block scale factor being the sum of the block scale factors of the first data block and the second data block, and gives the corrective block scale factor to the first scaling process, feeds data from the first data block to the first scaling process, gives no scale factor to the second scaling process, and feeds data from the third data block to the second scaling process.

With this configuration, given a source program containing computing expressions written using block floating variables, the computing expression detecting means detects the computing expressions for multiplication-accumulation in the given source program, the computing expression expanding means expands that part of the detected computing expressions which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction, and instruction code embedding means embeds the produced instruction codes in the object program.

Thus, when the object program is executed, in relation to that part of the computing expressions which involves multiplication-accumulation, a corrective block scale factor is calculated as a difference between a multiplication-result block scale factor and the block scale factor of the third data block and scale correction processes for digit place alignment among the data blocks are performed to align digit places before performing addition or subtraction in a multiplication process.

When a scale correction process is started, the process gives the corrective block scale factor to the first scaling process and feeds data from the first data block to the first scaling process. The process scales the data in the first data block based on the corrective block scale factor. Then, the multiplication process multiplies the second data block by the first data block from the first scaling process and feeds the result to the computational process as a multiplication-result data block. Thus, the data in the multiplication-result data block are corrected by means of scaling with respect to the first data block before multiplication so that their digit places will be aligned with those of the data in the third data block.

On the other hand, since no scale factor is given to the second scaling process and data from the third data block is fed to the second scaling process, the data in the third data block are fed to the computational process without scaling. In the final addition or subtraction, the computational process performs addition or subtraction using the multiplication-result data block from the multiplication process and the third data block from the second scaling process, with the digit places aligned.

Another embodiment of the present invention sets forth the compiler apparatus, characterized in that the process specified by the instruction codes performs either: a first scale correction process for giving the corrective block scale factor to the first scaling process, feeding data from the first data block to the first scaling process, giving no scale factor to the second scaling process, and feeding data from the third data block to the second scaling process; or a second scale correction process for giving the corrective block scale factor to the second scaling process, feeding data from the third data block to the second scaling process, giving no scale factor to the first scaling process, and feeding data from the first data block to the first scaling process.

With this configuration, when the object program is executed, in relation to multiplication-accumulation out of the computing expressions, a corrective block scale factor is calculated as a difference between a multiplication-result block scale factor and the block scale factor of the third data block and either the first scale correction process or second scale correction process is performed.

When the first scale correction process is started, the process gives the corrective block scale factor to the first scaling process and feeds data from the first data block to the first scaling process. The process scales the data in the first data block based on the corrective block scale factor by the first scaling process. Then, the multiplication process multiplies the second data block by the first data block from the first scaling process and feeds the result to the computational process as a multiplication-result data block. Thus, the data in the multiplication-result data block are corrected by means of scaling with respect to the first data block before multiplication so that their digit places will be aligned with those of the data in the third data block.

On the other hand, since no scale factor is given to the second scaling process and data from the third data block is fed to the second scaling process, the data in the third data block are fed to the computational process without scaling. In the final addition or subtraction, the computational process performs addition or subtraction using the multiplication-result data block from the multiplication process and the third data block from the second scaling process, with the digit places aligned.

When the second scale correction process is started, the process gives the corrective block scale factor to the second scaling process and feeds data from the third data block to the second scaling process. The second scaling process scales the data in the third data block based on the corrective block scale factor and feeds the result to the computational process. Thus, the data in the third data block are corrected by means of scaling so that their digit places will be aligned with those of the data in the multiplication-result data block.

On the other hand, since no scale factor is given to the first scaling process and data from the first data block is fed to the first scaling process, the data in the first data block are fed to the multiplication process without scaling. Then, the multiplication process multiplies the second data block by the first data block from the first scaling process and feeds the result to the computational process as a multiplication-result data block. In the final addition or subtraction, the computational process performs addition or subtraction using the multiplication-result data block from the multiplication process and the third data block from the second scaling process, with the digit places aligned.

Another embodiment of the present invention sets forth the compiler apparatus, characterized in that: the process specified by the instruction codes selectively performs either the first scale correction process or the second scale correction process based on magnitude relation between the multiplication-result block scale factor and the block scale factor of the third data block.

With this configuration, the compiler apparatus selectively performs either the first scale correction process or the second scale correction process based on magnitude relation between the multiplication-result block scale factor and the block scale factor of the third data block.

Another embodiment of the present invention sets forth the compiler apparatus, characterized in that: the first scaling process shifts inputted data to lower-order bits by a shift amount equivalent to a given scale factor; the second scaling process shifts inputted data to lower-order bits by a shift amount equivalent to a given scale factor; and the process specified by the instruction codes performs the first scale correction process when the block scale factor of the third data block is larger than the multiplication-result block scale factor, and performs the second scale correction process when the multiplication-result block scale factor is larger than the block scale factor of the third data block.

With this configuration, when the block scale factor of the third data block is larger than the multiplication-result block scale factor, the compiler apparatus performs the first scale correction process. On the other hand, when the multiplication-result block scale factor is larger than the block scale factor of the third data block, the compiler apparatus performs the second scale correction process. That is, the first scaling process or second scaling process shifts the data in the smaller of the block scale factors—the block scale factor of the third data block and the multiplication-result block scale factor—to lower-order bits by a shift amount equivalent to the corrective block scale factor (hereinafter referred to simply as right-shifting).

Another embodiment of the present invention sets forth the compiler apparatus, characterized in that: the first scaling process shifts inputted data to higher-order bits by a shift amount equivalent to a given scale factor; the second scaling process shifts inputted data to higher-order bits by a shift amount equivalent to a given scale factor; and the process specified by the instruction codes performs the second scale correction process when the block scale factor of the third data block is larger than the multiplication-result block scale factor, and performs the first scale correction process when the multiplication-result block scale factor is larger than the block scale factor of the third data block.

With this configuration, when the block scale factor of the third data block is larger than the multiplication-result block scale factor, the compiler apparatus performs the second scale correction process. On the other hand, when the multiplication-result block scale factor is larger than the block scale factor of the third data block, the compiler apparatus performs the first scale correction process. That is, the first scaling process or second scaling process shifts the data in the smaller of the block scale factors—the block scale factor of the third data block and the multiplication-result block scale factor—to higher-order bits by a shift amount equivalent to the corrective block scale factor (hereinafter referred to simply as left-shifting).

Another embodiment of the present invention sets forth a compiler apparatus which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the compiler apparatus comprises computing expression detecting means for detecting the computing expressions for multiplication-accumulation in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, calculates a corrective block scale factor which is a difference between a multiplication-result block scale factor and the block scale factor of the third data block, the multiplication-result block scale factor being the sum of the block scale factors of the first data block and the second data block, and adds the corrective block scale factor to the scale factor consisting of the difference between the group scale factor of each data group in the first data block and the block scale factor of the first data block, gives the sum to the first scaling process, and feeds data in the data group to the first scaling process as well as gives the scale factor consisting of the difference between the group scale factor of each data group in the third data block and the block scale factor of the third data block to the second scaling process and feeds data in the data group to the second scaling process.

With this configuration, given a source program containing computing expressions written using block floating variables, the computing expression detecting means detects the computing expressions for multiplication-accumulation in the given source program, the computing expression expanding means expands that part of the detected computing expressions which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction, and instruction code embedding means embeds the produced instruction codes in the object program.

Thus, when the object program is executed, in relation to that part of the computing expressions which involves multiplication-accumulation, a corrective block scale factor is calculated as a difference between a multiplication-result block scale factor and the block scale factor of the third data block and scale correction processes for digit place alignment among the data blocks are performed to align digit places before performing addition or subtraction in a multiplication process.

When a scale correction process is started, the process adds the corrective block scale factor to the scale factor consisting of the difference between the group scale factor of each data group in the first data block and the block scale factor of the first data block, gives the sum to the first scaling process, and feeds data in the data group to the first scaling process. Then, the first scaling process scales data in the first data block based on the group scale factors, block scale factor, and corrective block scale factor. Then, the multiplication process multiplies the second data block by the first data block from the first scaling process and feeds the result to the computational process as a multiplication-result data block. Thus, the data in the multiplication-result data block are corrected by means of scaling with respect to the first data block before multiplication so that their digit places will be aligned with those of the data in the third data block.

On the other hand, the process feeds the scale factors consisting of the differences between the group scale factors of data groups in the third data block and the block scale factor of the third data block to the second scaling process together with data in the data groups. Then, the second scaling process scales the data in the third data block based on the group scale factors and block scale factor and feeds the result to the computational process. In the final addition or subtraction, the computational process performs addition or subtraction using the multiplication-result data block from the multiplication process and the third data block from the second scaling process, with the digit places aligned.

Another embodiment of the present invention sets forth the compiler apparatus, characterized in that the process specified by the instruction codes performs either: a first scale correction process for adding the corrective block scale factor to the scale factor consisting of the difference between the group scale factor of each data group in the first data block and the block scale factor of the first data block, giving the sum to the first scaling process, and feeding data in the data group to the first scaling process as well as giving the scale factor consisting of the difference between the group scale factor of each data group in the third data block and the block scale factor of the third data block to the second scaling process and feeding data in the data group to the second scaling process; or a second scale correction process for adding the corrective block scale factor to the scale factor consisting of the difference between the group scale factor of each data group in the third data block and the block scale factor of the third data block, giving the sum to the second scaling process, and feeding data in the data group to the second scaling process as well as giving the scale factor consisting of the difference between the group scale factor of each data group in the first data block and the block scale factor of the first data block to the first scaling process and feeding data in the data group to the first scaling process.

With this configuration, when the object program is executed, in relation to multiplication-accumulation out of the computing expressions, a corrective block scale factor is calculated as a difference between a multiplication-result block scale factor and the block scale factor of the third data block and either the first scale correction process or second scale correction process is performed.

When the first scale correction process is started, the process adds the corrective block scale factor to the scale factor consisting of the difference between the group scale factor of each data group in the first data block and the block scale factor of the first data block, gives the sum to the first scaling process, and feeds data in the data group to the first scaling process. Then, the first scaling process scales data in the first data block based on the group scale factors, block scale factor, and corrective block scale factor. Then, the multiplication process multiplies the second data block by the first data block from the first scaling process and feeds the result to the computational process as a multiplication-result data block. Thus, the data in the multiplication-result data block are corrected by means of scaling with respect to the first data block before multiplication so that their digit places will be aligned with those of the data in the third data block.

On the other hand, the second scale correction gives the scale factor consisting of the difference between the group scale factor of each data group in the third data block and the block scale factor of the third data block to the second scaling process and feeds data in the data group to the second scaling process. Then, the second scaling process scales the data in the third data block based on the group scale factors and block scale factor and feeds the result to the computational process. In the final addition or subtraction, the computational process performs addition or subtraction using the multiplication-result data block from the multiplication process and the third data block from the second scaling process, with the digit places aligned.

When the second scale correction process is started, the process adds the corrective block scale factor to the scale factor consisting of the difference between the group scale factor of each data group in the third data block and the block scale factor of the third data block, gives the sum to the second scaling process, and feeds data in the data group to the second scaling process. Then, the second scaling process scales the data in the third data block based on the group scale factors, block scale factor, and corrective block scale factor and feeds the result to the computational process. Thus, the data in the third data block are corrected by means of scaling so that their digit places will be aligned with those of the data in the multiplication-result data block.

On the other hand, the process feeds the scale factors consisting of the differences between the group scale factors of data groups in the first data block and the block scale factor of the first data block to the first scaling process together with data in the data groups. Then, the first scaling process scales the data in the first data block based on the group scale factors and block scale factor and feeds the result to the multiplication process. Then, the multiplication process multiplies the second data block by the first data block from the first scaling process and feeds the result to the computational process as a multiplication-result data block. In the final addition or subtraction, the computational process performs addition or subtraction using the multiplication-result data block from the multiplication process and the third data block from the second scaling process, with the digit places aligned.

On the other hand, to achieve the above objects, an embodiment of the present invention sets forth a compiler program that makes a computer execute processes which handle block floating-point variables.

Another embodiment of the present invention sets forth the compiler program, characterized by making a computer execute the process of generating such instruction codes as to: calculate an operational block scale factor based on a computing expression and on information about operand of the computing expression; and perform a shifting process based on the operational block scale factor and on block scale factors and feed data to a computing unit, in the case of block floating-point variables.

Another embodiment of the present invention sets forth the compiler program, characterized by making a computer execute the process of generating such instruction codes as to: calculate an interim scale factor based on a computing expression and on information about operand of the computing expression; and normalize computational results and calculate block scale factors based on updated group scale factors updated as a result of the normalization and on the interim scale factor, in the case of block floating-point output variables.

Another embodiment of the present invention sets forth a compiler program that makes a computer execute processes which handle hierarchical block floating-point variables.

Another embodiment of the present invention sets forth the compiler program, characterized by making a computer execute the process of generating such instruction codes as to: calculate an operational block scale factor based on a computing expression and on information about operand of the computing expression; and perform a shifting process based on the operational block scale factor, block scale factors, and group scale factors and feed data to a computing unit, in the case of hierarchical block floating-point variables.

Another embodiment of the present invention sets forth the compiler program, characterized by making a computer execute the process of generating such instruction codes as to: calculate an interim scale factor based on a computing expression and on information about operand of the computing expression; and in the case of hierarchical block floating-point output variables, group-normalize computational results, calculate final group scale factors based on the group scale factors updated as a result of the group normalization and on the interim scale factor, and calculate a block scale factor from the calculated group scale factors.

Another embodiment of the present invention sets forth a compiler program which handles block floating-point variables, characterized by making a computer execute the process of: generating such instruction codes, in the case of multiplication or division, as to calculate a block scale factor of multiplication results based on block scale factors of block floating-point variables.

Another embodiment of the present invention sets forth a compiler program which handles block floating-point variables and fixed-point variables, characterized by making a computer execute the process of: generating such instruction codes, in the case of multiplication or division, as to calculate a block scale factor of multiplication results based on block scale factors of block floating-point variables.

Another embodiment of the present invention sets forth a compiler program which handles hierarchical block floating-point variables, characterized by making a computer execute the process of: generating such instruction codes, in the case of multiplication or division, as to calculate block scale factors of computational results based on block scale factors of hierarchical block floating-point variables.

Another embodiment of the present invention sets forth a compiler program which handles block floating-point variables, characterized by making a computer execute the process of generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth a compiler program which handles block floating-point variables and fixed-point variables, characterized by making a computer execute the process of generating such instruction codes, in the case of addition or subtraction, as to: select a common block scale factor based on comparison between a block scale factor of a block floating-point variable and a virtual block scale factor of a fixed-point variable given by a constant; scale data in data blocks based on the common scale factor; and perform addition or subtraction on the scaled data.

Another embodiment of the present invention sets forth a compiler program which handles hierarchical block floating-point variables, characterized by making a computer execute the process of generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth a compiler program which handles block floating-point variables, characterized by making a computer execute the process of generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth a compiler program which handles block floating-point variables and fixed-point variables, characterized by making a computer execute the process of generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth a compiler program which handles hierarchical block floating-point variables, characterized by making a computer execute the process of generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth a compiler program which handles block floating-point variables, characterized by making a computer execute the process of: performing arithmetic operations on block floating variables to be subjected to multiplication out of multiplication-accumulation, accumulating multiplication results to complete multiplication-accumulation, producing the computational result as a computational-result data block, and calculating a computational-result block scale factor based on block scale factors.

Another embodiment of the present invention sets forth a compiler program which handles block floating-point variables and fixed-point variables, characterized by making a computer execute the process of: performing arithmetic operations on block floating variables and fixed-point variables to be subjected to multiplication out of multiplication-accumulation, accumulating multiplication results to complete multiplication-accumulation, producing the computational result as a computational-result data block, and calculating a computational-result block scale factor based on block scale factors.

Another embodiment of the present invention sets forth a compiler program which handles hierarchical block floating-point variables, characterized by making a computer execute the process of: scaling data of hierarchical block floating variables to be subjected to multiplication out of multiplication-accumulation using a scale factor consisting of a difference between group scale factor and block scale factor, performing arithmetic operations on the scaled data, accumulating multiplication results to complete multiplication-accumulation, producing the computational result as a computational-result data block, and calculating a computational-result block scale factor based on block scale factors.

Another embodiment of the present invention sets forth a compiler program which translates a given source program into an object program when the source program contains computing expressions which are written using block floating variables of a Block Floating data type, characterized in that: each of the block floating variables constitutes a data block containing one or more data items and the data block is a variable which represents a data structure containing a block scale factor of the data block; and the compiler program makes a computer execute processes implemented as computing expression detecting means for detecting the computing expressions in the source program, computing expression expanding means for expanding the computing expressions detected by the computing expression detecting means into predetermined instruction codes, and instruction code conversion means for converting the instruction codes produced by the computing expression expanding means into the object program.

Another embodiment of the present invention sets forth the compiler program, characterized in that: the computing expression detecting means detects operators in the expressions, the data type of input operand for the operators, and the data type of output operand for the operators as detection results; and the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand if the input operand is block floating type data.

Another embodiment of the present invention sets forth the compiler program, characterized in that: the computing expression expanding means expands any block floating type data fed to a computing unit into instruction codes which specify a computational process based on the operators; and the computing expression expanding means produces instruction codes which specify a data output process for calculating an interim block scale factor from the block scale factors of input data blocks, normalizing computational results which correspond to an output operand, and calculating block scale factors from the interim block scale factor if the output operand is block floating type data.

Another embodiment of the present invention sets forth a compiler program which translates a given source program into an object program when the source program contains computing expressions which are written using block floating variables of a Block Floating data type, characterized in that: each of the block floating variables constitutes a data block containing one or more data groups, each of which in turn contains one or more data items and one group scale factor, the data block being a variable which represents a data structure containing a block scale factor of the data block; and the compiler program makes a computer execute processes implemented as computing expression detecting means for detecting the computing expressions in the source program, computing expression expanding means for expanding the computing expressions detected by the computing expression detecting means into predetermined instruction codes, and instruction code conversion means for converting the instruction codes produced by the computing expression expanding means into the object program.

Another embodiment of the present invention sets forth the compiler program, characterized in that: the computing expression detecting means detects operators in the expressions, the data type of input operand for the operators, and the data type of output operand for the operators as detection results; and the computing expression expanding means operates based on the operators and data type information about input operand for the operators in the detection results produced by the computing expression detecting means, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand as well as on the group scale factor if the input operand is block floating type data.

Another embodiment of the present invention sets forth the compiler program, characterized in that: the computing expression expanding means expands any block floating type data fed to a computing unit into instruction codes which specify a computational process based on the operators; and the computing expression expanding means produces instruction codes which specify a data output process for calculating an interim block scale factor from the block scale factors of input data blocks, group-normalizing computational results which correspond to an output operand, calculating final group scale factors based on either or both of updated group scale factors calculated as a result of the group normalization and/or the interim block scale factor, and calculating a block scale factor from the calculated group scale factors if the output operand is block floating type data.

Another embodiment of the present invention sets forth a compiler program which translates a given source program into an object program when the source program contains computing expressions which are written using block floating variables, characterized in that: each of the block floating variables constitutes a data block containing one or more data items and the data block is a variable which represents a data structure containing a block scale factor of the data block; and the compiler program makes a computer execute processes implemented as computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables to be subjected to multiplication or division; and the process specified by the instruction codes performs multiplication or division on data in the data blocks, produces the computational result as a computational-result data block, and calculates the block scale factor of the computational-result data block based on the block scale factors of the data blocks.

Another embodiment of the present invention sets forth a compiler program which translates a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the compiler program makes a computer execute processes implemented as computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables and fixed-point variables to be subjected to multiplication or division; and the process specified by the instruction codes performs multiplication or division on data in the data blocks which correspond to the block floating variables and data in the data blocks which correspond to the fixed-point variables, produces the computational result as a computational-result data block, and calculates the block scale factor of the computational-result data block based on the block scale factors of the data blocks which correspond to the block floating variables.

Another embodiment of the present invention sets forth a compiler program which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the compiler program makes a computer execute processes implemented as computing expression detecting means for detecting the computing expressions for multiplication or division in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication or division into instruction codes which specify multiplication or division for data blocks corresponding to the block floating variables to be subjected to multiplication or division; and the process specified by the instruction codes performs multiplication or division on data in each data group of the data block, produces the computational result as a computational-result data block, and calculates the block scale factor of the computational-result data block based on the block scale factor of the data block.

Another embodiment of the present invention sets forth a compiler program which translates a given source program into an object program when the source program contains computing expressions which are written using block floating variables, characterized in that: each of the block floating variables constitutes a data block containing one or more data items and the data block is a variable which represents a data structure containing a block scale factor of the data block; the compiler program makes a computer execute processes implemented as computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data blocks based on the common block scale factor, and performs addition or subtraction on the scaled data in the data blocks.

Another embodiment of the present invention sets forth a compiler program which translates a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the compiler program makes a computer execute processes implemented as computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables and fixed-point variables to be subjected to addition or subtraction; and the process specified by the instruction codes calculates a virtual block scale factor of fixed-point data blocks as a constant, selects the block scale factor of the data block containing data with the maximum absolute value as a common block scale factor from among the block scale factors of the data blocks which correspond to the block floating variables and the virtual block scale factor, scales data in the data blocks based on the common block scale factor, and performs addition or subtraction on the scaled data in the data blocks and data in the data blocks which correspond to the fixed-point variables.

Another embodiment of the present invention sets forth a compiler program which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the compiler program makes a computer execute processes implemented as computing expression detecting means for detecting the computing expressions for addition or subtraction in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data groups in each data block based on scale factors consisting of differences between the group scale factors of the respective data groups and the common block scale factor, and performs addition or subtraction on the scaled data in the data blocks.

Another embodiment of the present invention sets forth a compiler program which translates a given source program into an object program when the source program contains computing expressions which are written using block floating variables, characterized in that: each of the block floating variables constitutes a data block containing one or more data items and the data block is a variable which represents a data structure containing a block scale factor of the data block; the compiler program makes a computer execute processes implemented as computing expression detecting means for detecting the computing expressions for multiplication-accumulation in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, further calculates a corrective block scale factor which is a difference between a multiplication-result block scale factor and the block scale factor of the third data block, the multiplication-result block scale factor being the sum of the block scale factors of the first data block and the second data block, and gives the corrective block scale factor to the first scaling process, feeds data from the first data block to the first scaling process, gives no scale factor to the second scaling process, and feeds data from the third data block to the second scaling process.

Another embodiment of the present invention sets forth the compiler program, characterized in that the process specified by the instruction codes performs either: a first scale correction process for giving the corrective block scale factor to the first scaling process, feeding data from the first data block to the first scaling process, giving no scale factor to the second scaling process, and feeding data from the third data block to the second scaling process; or a second scale correction process for giving the corrective block scale factor to the second scaling process, feeding data from the third data block to the second scaling process, giving no scale factor to the first scaling process, and feeding data from the first data block to the first scaling process.

Another embodiment of the present invention sets forth the compiler program, characterized in that: the process specified by the instruction codes selectively performs either the first scale correction process or the second scale correction process based on magnitude relation between the multiplication-result block scale factor and the block scale factor of the third data block.

Another embodiment of the present invention sets forth the compiler program, characterized in that: the first scaling process shifts inputted data to lower-order bits by a shift amount equivalent to a given scale factor; the second scaling process shifts inputted data to lower-order bits by a shift amount equivalent to a given scale factor; and the process specified by the instruction codes performs the first scale correction process when the block scale factor of the third data block is larger than the multiplication-result block scale factor, and performs the second scale correction process when the multiplication-result block scale factor is larger than the block scale factor of the third data block.

Another embodiment of the present invention sets forth the compiler program, characterized in that: the first scaling process shifts inputted data to higher-order bits by a shift amount equivalent to a given scale factor; the second scaling process shifts inputted data to higher-order bits by a shift amount equivalent to a given scale factor; and the process specified by the instruction codes performs the second scale correction process when the block scale factor of the third data block is larger than the multiplication-result block scale factor, and performs the first scale correction process when the multiplication-result block scale factor is larger than the block scale factor of the third data block.

Another embodiment of the present invention sets forth a compiler program which translates a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale fact or of the data block; the compiler program makes a computer execute processes implemented as computing expression detecting means for detecting the computing expressions for multiplication-accumulation in the source program, computing expression expanding means for expanding the computing expressions detected by the computing expression detecting means into predetermined instruction codes, and instruction code embedding means for embedding the instruction codes produced by the computing expression expanding means in the object program; of the computing expressions detected by the computing expression detecting means, the computing expression expanding means expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, calculates a corrective block scale factor which is a difference between a multiplication-result block scale factor and the block scale factor of the third data block, the multiplication-result block scale factor being the sum of the block scale factors of the first data block and the second data block, and adds the corrective block scale factor to the scale factor consisting of the difference between the group scale factor of each data group in the first data block and the block scale factor of the first data block, gives the sum to the first scaling process, and feeds data in the data group to the first scaling process as well as gives the scale factor consisting of the difference between the group scale factor of each data group in the third data block and the block scale factor of the third data block to the second scaling process and feeds data in the data group to the second scaling process.

Another embodiment of the present invention sets forth the compiler program, characterized in that the process specified by the instruction codes performs either: a first scale correction process for adding the corrective block scale factor to the scale factor consisting of the difference between the group scale factor of each data group in the first data block and the block scale factor of the first data block, giving the sum to the first scaling process, and feeding data in the data group to the first scaling process as well as giving the scale factor consisting of the difference between the group scale factor of each data group in the third data block and the block scale factor of the third data block to the second scaling process and feeding data in the data group to the second scaling process; or a second scale correction process for adding the corrective block scale factor to the scale factor consisting of the difference between the group scale factor of each data group in the third data block and the block scale factor of the third data block, giving the sum to the second scaling process, and feeding data in the data group to the second scaling process as well as giving the scale factor consisting of the difference between the group scale factor of each data group in the first data block and the block scale factor of the first data block to the first scaling process and feeding data in the data group to the first scaling process.

Another embodiment of the present invention sets forth the object program generating method, characterized by generating such instruction codes as to: calculate an operational block scale factor based on a computing expression and on information about operand of the computing expression; and perform a shifting process based on the operational block scale factor and on block scale factors and feed data to a computing unit, in the case of block floating-point variables.

Another embodiment of the present invention sets forth the object program generating method, characterized by generating such instruction codes as to: calculate an interim scale factor based on a computing expression and on information about operand of the computing expression; and normalize computational results and calculate block scale factors based on updated group scale factors updated as a result of the normalization and on the interim scale factor, in the case of block floating-point output variables.

Another embodiment of the present invention sets forth an object program generating method which handles hierarchical block floating-point variables.

Another embodiment of the present invention sets forth the object program generating method, characterized by generating such instruction codes as to: calculate an operational block scale factor based on a computing expression and on information about operand of the computing expression; and perform a shifting process based on the operational block scale factor, block scale factors, and group scale factors and feed data to a computing unit, in the case of hierarchical block floating-point variables.

Another embodiment of the present invention sets forth the object program generating method, characterized by generating such instruction codes as to: calculate an interim scale factor based on a computing expression and on information about operand of the computing expression; and in the case of hierarchical block floating-point output variables, group-normalize computational results, calculate final group scale factors based on the group scale factors updated as a result of the group normalization and on the interim scale factor, and calculate a block scale factor from the calculated group scale factors.

Another embodiment of the present invention sets forth an object program generating method which handles block floating-point variables, characterized by: generating such instruction codes, in the case of multiplication or division, as to calculate a block scale factor of multiplication results based on block scale factors of block floating-point variables.

Another embodiment of the present invention sets forth an object program generating method which handles block floating-point variables and fixed-point variables, characterized by: generating such instruction codes, in the case of multiplication or division, as to calculate a block scale factor of multiplication results based on block scale factors of block floating-point variables.

Another embodiment of the present invention sets forth an object program generating method which handles hierarchical block floating-point variables, characterized by: generating such instruction codes, in the case of multiplication or division, as to calculate block scale factors of computational results based on block scale factors of hierarchical block floating-point variables.

Another embodiment the present invention sets forth an object program generating method which handles block floating-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth an object program generating method which handles block floating-point variables and fixed-point variables, characterized by generating such instruction codes, in the case of addition or subtraction, as to: select a common block scale factor based on comparison between a block scale factor of a block floating-point variable and a virtual block scale factor of a fixed-point variable given by a constant; scale data in data blocks based on the common scale factor; and perform addition or subtraction on the scaled data.

Another embodiment of the present invention sets forth an object program generating method which handles hierarchical block floating-point variables, characterized by generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth an object program generating method which handles block floating-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth an object program generating method which handles block floating-point variables and fixed-point variables, characterized by generating such instruction codes, in the case of addition or subtraction, as to: select a common block scale factor based on comparison of block scale factors of block floating-point variables; scale data in data blocks based on the common scale factor; and perform addition or subtraction on the scaled data.

Another embodiment of the present invention sets forth an object program generating method which handles hierarchical block floating-point variables, characterized by generating such instruction codes, in the case of addition or subtraction, as to: select a common block scale factor based on comparison of block scale factors of hierarchical block floating-point variables; scale data in data groups based on differences between the common scale factor and group scale factors of the respective data groups; and perform addition or subtraction on the scaled data.

Another embodiment of the present invention sets forth an object program generating method which handles block floating-point variables, characterized by: performing arithmetic operations on block floating variables to be subjected to multiplication out of multiplication-accumulation, accumulating multiplication results to complete multiplication-accumulation, producing the computational result as a computational-result data block, and calculating a computational-result block scale factor based on block scale factors.

Another embodiment of the present invention sets forth an object program generating method which handles block floating-point variables and fixed-point variables, characterized by: performing arithmetic operations on block floating variables and fixed-point variables to be subjected to multiplication out of multiplication-accumulation, accumulating multiplication results to complete multiplication-accumulation, producing the computational result as a computational-result data block, and calculating a computational-result block scale factor based on block scale factors.

Another embodiment of the present invention sets forth an object program generating method which handles hierarchical block floating-point variables, characterized by: scaling data of hierarchical block floating variables to be subjected to multiplication out of multiplication-accumulation using a scale factor consisting of a difference between group scale factor and block scale factor, performing arithmetic operations on the scaled data, accumulating multiplication results to complete multiplication-accumulation, producing the computational result as a computational-result data block, and calculating a computational-result block scale factor based on block scale factors.

Another embodiment of the present invention sets forth an object program generating method for translating a given source program into an object program when the source program contains computing expressions which are written using block floating variables of a Block Floating data type, characterized in that: each of the block floating variables constitutes a data block containing one or more data items and the data block is a variable which represents a data structure containing a block scale factor of the data block; and the object program generating method comprises a computing expression detecting step of detecting the computing expressions in the source program, a computing expression expanding step of expanding the computing expressions detected in the computing expression detecting step into predetermined instruction codes, and an instruction code conversion step of converting the instruction codes produced in the computing expression expanding step into the object program.

Another embodiment of the present invention sets forth the object program generating method, characterized in that: the computing expression detecting step detects operators in the expressions, the data type of input operand for the operators, and the data type of output operand for the operators as detection results; and the computing expression expanding step operates based on the operators and data type information about input operand for the operators in the detection results produced in the computing expression detecting step, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand if the input operand is block floating type data.

Another embodiment of the present invention sets forth the object program generating method, characterized in that: the computing expression expanding step expands any block floating type data fed to a computing unit into instruction codes which specify a computational process based on the operators; and the computing expression expanding step produces instruction codes which specify a data output process for calculating an interim block scale factor from the block scale factors of input data blocks, normalizing computational results which correspond to an output operand, and calculating block scale factors from the interim block scale factor if the output operand is block floating type data.

Another embodiment of the present invention sets forth an object program generating method for translating a given source program into an object program when the source program contains computing expressions which are written using block floating variables of a Block Floating data type, characterized in that: each of the block floating variables constitutes a data block containing one or more data groups, each of which in turn contains one or more data items and one group scale factor, the data block being a variable which represents a data structure containing a block scale factor of the data block; and the object program generating method comprises a computing expression detecting step of detecting the computing expressions in the source program, a computing expression expanding step of expanding the computing expressions detected in the computing expression detecting step into predetermined instruction codes, and an instruction code conversion step of converting the instruction codes produced in the computing expression expanding step into the object program.

Another embodiment of the present invention sets forth the object program generating method, characterized in that: the computing expression detecting step detects operators in the expressions, the data type of input operand for the operators, and the data type of output operand for the operators as detection results; and the computing expression expanding step operates based on the operators and data type information about input operand for the operators in the detection results produced in the computing expression detecting step, generating instruction codes which specify a process of calculating an operational block scale factor from the block scale factors of input data blocks if input operand contain block floating type data, and generating instruction codes which specify a process of feeding block floating type data into a computing unit for performing a shifting process based on either or both of the operational block scale factor and/or the block scale factor of an input operand as well as on the group scale factor if the input operand is block floating type data.

Another embodiment of the present invention sets forth the object program generating method, characterized in that: the computing expression expanding step expands any block floating type data fed to a computing unit into instruction codes which specify a computational process based on the operators; and the computing expression expanding step produces instruction codes which specify a data output process for calculating an interim block scale factor from the block scale factors of input data blocks, group-normalizing computational results which correspond to an output operand, calculating final group scale factors based on either or both of updated group scale factors calculated as a result of the group normalization and/or the interim block scale factor, and calculating a block scale factor from the calculated group scale factors if the output operand is block floating type data.

Another embodiment of the present invention sets forth an object program generating method for translating a given source program into an object program when the source program contains computing expressions which are written using block floating variables, characterized in that: each of the block floating variables constitutes a data block containing one or more data items and the data block is a variable which represents a data structure containing a block scale factor of the data block; and the object program generating method comprises a computing expression detecting step of detecting the computing expressions for multiplication or division in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves multiplication or division into instruction codes which specify multiplication or division for data blocks corresponding to the block floating variables to be subjected to multiplication or division; and the process specified by the instruction codes performs multiplication or division on data in the data blocks, produces the computational result as a computational-result data block, and calculates the block scale factor of the computational-result data block based on the block scale factors of the data blocks.

Another embodiment of the present invention sets forth an object program generating method for translating a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the object program generating method comprises a computing expression detecting step of detecting the computing expressions for multiplication or division in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves multiplication or division into instruction codes which specify multiplication or division for data blocks corresponding to the block floating variables and fixed-point variables to be subjected to multiplication or division; and the process specified by the instruction codes performs multiplication or division on data in the data blocks which correspond to the block floating variables and data in the data blocks which correspond to the fixed-point variables, produces the computational result as a computational-result data block, and calculates the block scale factor of the computational-result data block based on the block scale factors of the data blocks which correspond to the block floating variables.

Another embodiment of the present invention sets forth an object program generating method for translating a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the object program generating method comprises a computing expression detecting step of detecting the computing expressions for multiplication or division in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves multiplication or division into instruction codes which specify multiplication or division for data blocks corresponding to the block floating variables to be subjected to multiplication or division; and the process specified by the instruction codes performs multiplication or division on data in each data group of the data block, produces the computational result as a computational-result data block, and calculates the block scale factor of the computational-result data block based on the block scale factor of the data block.

Another embodiment of the present invention sets forth an object program generating method for translating a given source program into an object program when the source program contains computing expressions which are written using block floating variables, characterized in that: each of the block floating variables constitutes a data block containing one or more data items and the data block is a variable which represents a data structure containing a block scale factor of the data block; the object program generating method comprises a computing expression detecting step of detecting the computing expressions for addition or subtraction in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data blocks based on the common block scale factor, and performs addition or subtraction on the scaled data in the data blocks.

Another embodiment of the present invention sets forth an object program generating method for translating a given source program into an object program when the source program contains computing expressions which are written using block floating variables and fixed-point variables, characterized in that: each of the block floating variables constitutes a data block containing one or more data items and the data block is a variable which represents a data structure containing a block scale factor of the data block; each of the fixed-point variables represents a data structure which constitutes a data block containing one or more data items; the object program generating method comprises a computing expression detecting step of detecting the computing expressions for addition or subtraction in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves addition or subtraction into instruction codes which specify addition or subtraction for data blocks corresponding to the block floating variables and fixed-point variables to be subjected to addition or subtraction; and the process specified by the instruction codes calculates a virtual block scale factor of fixed-point data blocks as a constant, selects the block scale factor of the data block containing data with the maximum absolute value as a common block scale factor from among the block scale factors of the data blocks which correspond to the block floating variables and the virtual block scale factor, scales data in the data blocks based on the common block scale factor, and performs addition or subtraction on the scaled data in the data blocks and data in the data blocks which correspond to the fixed-point variables.

Another embodiment of the present invention sets forth an object program generating method for translating a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the object program generating method comprises a computing expression detecting step of detecting the computing expressions for addition or subtraction in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data groups in each data block based on scale factors consisting of differences between the group scale factors of the respective data groups and the common block scale factor, and performs addition or subtraction on the scaled data in the data blocks.

Another embodiment of the present invention sets forth an object program generating method for translating a given source program into an object program when the source program contains computing expressions which are written using block floating variables, characterized in that: each of the block floating variables constitutes a data block containing one or more data items and the data block is a variable which represents a data structure containing a block scale factor of the data block; the object program generating method comprises a computing expression detecting step of detecting the computing expressions for multiplication-accumulation in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, further calculates a corrective block scale factor which is a difference between a multiplication-result block scale factor and the block scale factor of the third data block, the multiplication-result block scale factor being the sum of the block scale factors of the first data block and the second data block, and gives the corrective block scale factor to the first scaling process, feeds data from the first data block to the first scaling process, gives no scale factor to the second scaling process, and feeds data from the third data block to the second scaling process.

Another embodiment of the present invention sets forth the object program generating method, characterized in that the process specified by the instruction codes performs either: a first scale correction process for giving the corrective block scale factor to the first scaling process, feeding data from the first data block to the first scaling process, giving no scale factor to the second scaling process, and feeding data from the third data block to the second scaling process; or a second scale correction process for giving the corrective block scale factor to the second scaling process, feeding data from the third data block to the second scaling process, giving no scale factor to the first scaling process, and feeding data from the first data block to the first scaling process.

Another embodiment of the present invention sets forth the object program generating method, characterized in that the process specified by the instruction codes performs either: a first scale correction process for giving the corrective block scale factor to the first scaling process, feeding data from the first data block to the first scaling process, giving no scale factor to the second scaling process, and feeding data from the third data block to the second scaling process; or a second scale correction process for giving the corrective block scale factor to the second scaling process, feeding data from the third data block to the second scaling process, giving no scale factor to the first scaling process, and feeding data from the first data block to the first scaling process.

Another embodiment of the present invention sets forth the object program generating method, characterized in that: the process specified by the instruction codes selectively performs either the first scale correction process or the second scale correction process based on magnitude relation between the multiplication-result block scale factor and the block scale factor of the third data block.

Another embodiment of the present invention sets forth the object program generating method, characterized in that: the first scaling process shifts inputted data to lower-order bits by a shift amount equivalent to a given scale factor; the second scaling process shifts inputted data to lower-order bits by a shift amount equivalent to a given scale factor; and the process specified by the instruction codes performs the first scale correction process when the block scale factor of the third data block is larger than the multiplication-result block scale factor, and performs the second scale correction process when the multiplication-result block scale factor is larger than the block scale factor of the third data block.

Another embodiment of the present invention sets forth the object program generating method, characterized in that: the first scaling process shifts inputted data to higher-order bits by a shift amount equivalent to a given scale factor; the second scaling process shifts inputted data to higher-order bits by a shift amount equivalent to a given scale factor; and the process specified by the instruction codes performs the second scale correction process when the block scale factor of the third data block is larger than the multiplication-result block scale factor, and performs the first scale correction process when the multiplication-result block scale factor is larger than the block scale factor of the third data block.

Another embodiment of the present invention sets forth an object program generating method for translating a given source program into an object program when the source program contains computing expressions which are written using block floating variables, characterized in that: each of the block floating variables constitutes a data block containing one or more data groups, each of which in turn contains one or more data items, the data block being a variable which represents a data structure containing the group scale factors of the respective data groups and the block scale factor of the data block; the object program generating method comprises a computing expression detecting step of detecting the computing expressions for multiplication-accumulation in the source program, a computing expression expanding step of expanding the computing expressions detected in the computing expression detecting step into predetermined instruction codes, and an instruction code embedding step of embedding the instruction codes produced in the computing expression expanding step in the object program; of the computing expressions detected in the computing expression detecting step, the computing expression expanding step expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process, calculates a corrective block scale factor which is a difference between a multiplication-result block scale factor and the block scale factor of the third data block, the multiplication-result block scale factor being the sum of the block scale factors of the first data block and the second data block, and adds the corrective block scale factor to the scale factor consisting of the difference between the group scale factor of each data group in the first data block and the block scale factor of the first data block, gives the sum to the first scaling process, and feeds data in the data group to the first scaling process as well as gives the scale factor consisting of the difference between the group scale factor of each data group in the third data block and the block scale factor of the third data block to the second scaling process and feeds data in the data group to the second scaling process.

Another embodiment of the present invention sets forth the object program generating method, characterized in that the process specified by the instruction codes performs either: a first scale correction process for adding the corrective block scale factor to the scale factor consisting of the difference between the group scale factor of each data group in the first data block and the block scale factor of the first data block, giving the sum to the first scaling process, and feeding data in the data group to the first scaling process as well as giving the scale factor consisting of the difference between the group scale factor of each data group in the third data block and the block scale factor of the third data block to the second scaling process and feeding data in the data group to the second scaling process; or a second scale correction process for adding the corrective block scale factor to the scale factor consisting of the difference between the group scale factor of each data group in the third data block and the block scale factor of the third data block, giving the sum to the second scaling process, and feeding data in the data group to the second scaling process as well as giving the scale factor consisting of the difference between the group scale factor of each data group in the first data block and the block scale factor of the first data block to the first scaling process and feeding data in the data group to the first scaling process.

Compiler apparatus, compiler programs, and object program generating methods for use to achieve the above objects have been described above, but they are not restrictive and first to third compiler apparatus described below may also be proposed.

The first compiler apparatus is a compiler apparatus which translates a given source program into an object program when the source program contains computing expressions which are written using block floating variables of a Block Floating data type, characterized in that:

each of the block floating variables constitutes a data block containing one or more data groups, each of which in turn contains one or more data items and one group scale factor, the data block being a variable which represents a data structure containing a block scale factor of the data block;

the compiler apparatus comprises computing expression detecting means for detecting the computing expressions in the source program, computing expression expanding means for expanding the computing expressions detected by the computing expression detecting means into predetermined instruction codes, and instruction code conversion means for converting the instruction codes produced by the computing expression expanding means into the object program;

the computing expression detecting means detects operators in the expressions, the data type of input operand for the operators, and the data type of output operand for the operators as detection results; and the computing expression expanding means operates based on the operators and data type information about input operand for the operators in the detection results produced by the computing expression detecting means, generating instruction codes which specify a process of calculating either or both of an operational block scale factor and/or interim block scale factor from the block scale factors of input data blocks if input operand contain block floating type data, generating instruction codes which specify a process of feeding block floating type data into a computing unit for performing a shifting process based on either or both of the operational block scale factor and/or the block scale factor of an input operand as well as on the group scale factor if the input operand is block floating type data, expanding any block floating type data fed to a computing unit into instruction codes which specify a computational process based on the operators, and generating instruction codes which specify a data output process for group-normalizing computational results which correspond to an output operand, calculating final group scale factors based on either or both of updated group scale factors calculated as a result of the group normalization and/or the interim block scale factor, and calculating a block scale factor from the calculated group scale factors if the output operand is block floating type data.

Here, the sentence "if input operand contain block floating type data" means a situation in which there are two or more input operand to be operated upon and at least one of them is block floating type data.

Also, the sentence "if the input operand is block floating type data" means a situation in which there is one input operand to be operated upon (i.e., arithmetic operations are to be performed within the data block) and the input operand is of the Block Floating type.

Also, the interim block scale factor corresponds to the common scale factor according to an embodiment of the invention if, for example, arithmetic operations performed are additions or subtractions. It corresponds to the multiplication-result block scale factor according to an embodiment of the invention, if arithmetic operations performed are multiplications or divisions.

Also, the operational block scale factor corresponds to the common scale factor if, for example, arithmetic operations performed are additions or subtractions.

The second compiler apparatus is the first compiler apparatus, characterized in that:

the operators in the computing expressions indicate addition or subtraction;

the instruction codes which specify a process of calculating the operational block scale factor are not generated if the input operand are of the Block Floating type and are from the same data block; and the process of feeding data into the computing unit involves a shifting process which is based on the difference between block scale factor and group scale factor.

The third compiler apparatus is the first compiler apparatus, characterized in that:

the operators in the computing expressions indicate addition or subtraction;

the computing expression expanding means produces instruction codes which specify a process of calculating the block scale factor of the data block containing data with the maximum absolute value as the operational block scale factor if the input operand are of the Block Floating type and are from a plurality of different data blocks;

and the process of feeding data into the computing unit involves a shifting process which is based on the difference between the operational block scale factor and group scale factor.

BRIEF DESCRIPTION OF THE DRAWINGS

FIG. 6 shows a source program which describes a multiplication formula in block floating-point format;

FIG. 7 shows an object program obtained by compiling the source program shown in FIG. 6;

FIG. 8 shows a source program which describes a multiplication formula in block floating-point format;

FIG. 9 shows an object program obtained by compiling the source program shown in FIG. 8;

FIG. 10 shows a source program which describes a multiply-accumulate formula in block floating-point format;

FIG. 12 shows a source program which describes a multiply-accumulate formula in block floating-point format;

BEST MODE FOR CARRYING OUT THE INVENTION

A preferred embodiment of the present invention will be described with reference to the drawings. FIGS. 1 to 5 are diagrams showing an embodiment of a data processing unit according to the present invention.

Figure 1:
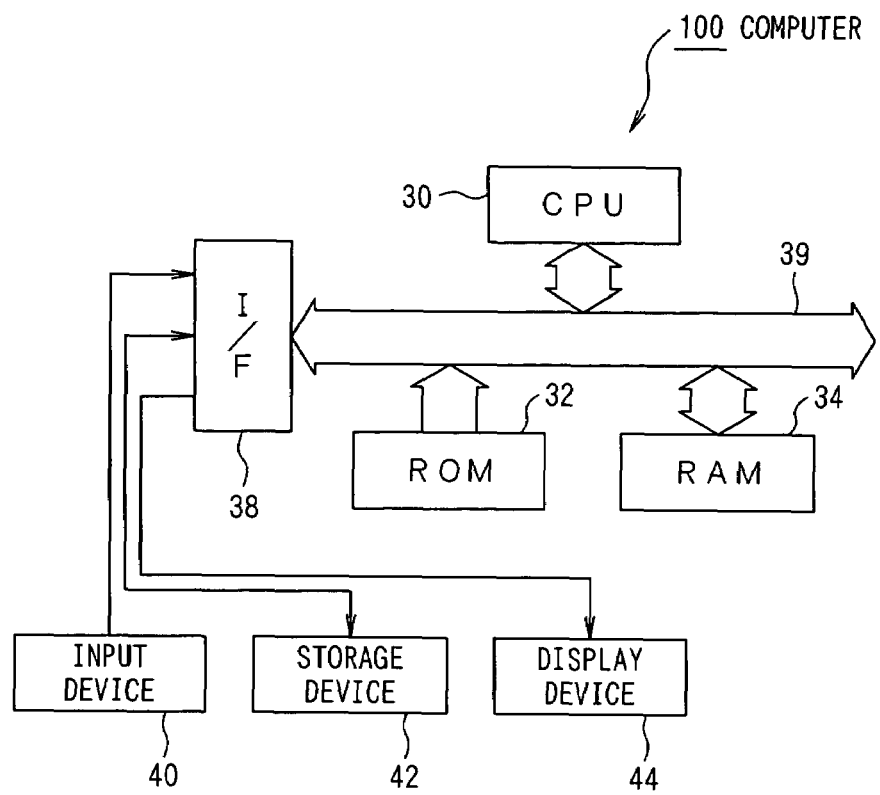
FIG. 1 is a block diagram showing a configuration of a computer.

In this embodiment, a compiler apparatus, compiler program, and object program generating method according to the present invention are applied to a case in which a source program containing computing expressions written in block floating-point format is translated on a computer 100 into an object program executable by the computer 100 as shown in FIG. 1. Hereinafter, translation and generation will be referred to collectively as compilation.

First, configuration of the computer 100 will be described in detail below with reference to FIG. 1. FIG. 1 is a block diagram showing the configuration of the computer 100.

As shown in FIG. 1, the computer 100 comprises a CPU 30 which performs arithmetic operations and controls the entire system based on a control program, a ROM 32 for prestoring the control program of the CPU 30 in a predetermined area, a RAM 34 for storing data read out of the ROM 32 and computational results needed in the computational processes of the CPU 30, and an I/F 38 which mediates input and output of data from/to external equipment, all of which are interconnected via a bus 39—which is a signal line for data transfer—to allow data exchange among them.

I/F 38 is connected with external devices: an input device 40 which serves as a human interface and consists of a keyboard, mouse, etc. for data input; a storage device 42 which stores data, tables, etc. in the form of files; and a display device 44 which displays images according to image signals.

Figure 2:
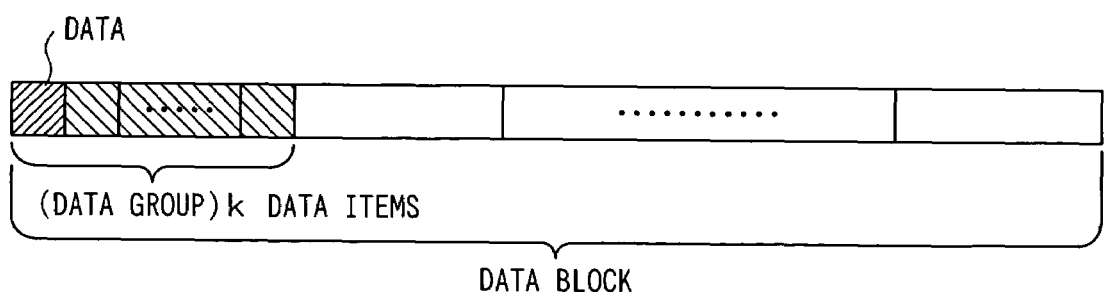
FIG. 2 is a diagram showing a data structure in block floating-point format.

The storage device 42 stores source programs and object programs in the form of files. According to the present invention, the source programs to be compiled can be written in a predetermined programming language (e.g., in the C language) and computing expressions in block floating-point format can be written using block floating variables. The block floating variables are variables which have a data structure in block floating-point format. As shown in FIG. 2, according to the data structure in block floating-point format, k data items are organized into a data group and two or more data groups are organized into a data block, which contains the group scale factors of individual data groups and the block scale factor of the data block. FIG. 2 is a diagram showing a data structure in block floating-point format.

Block floating variables are characterized in that they specify data structure in block floating-point format without indicating the group scale factors and block scale factor explicitly. Suppose, for example, the number of data groups in a data block is "3" and the number of data items in each data group is "2," a block floating variable can be defined in a source program using Equation (3) below. In this case, the data block contains three group scale factors and one block scale factor, but there is no need to indicate them explicitly in the source program. This makes it simple to write the source program.

$$\text{bfloat A[3][2];} \qquad (3)$$

Figure 3:
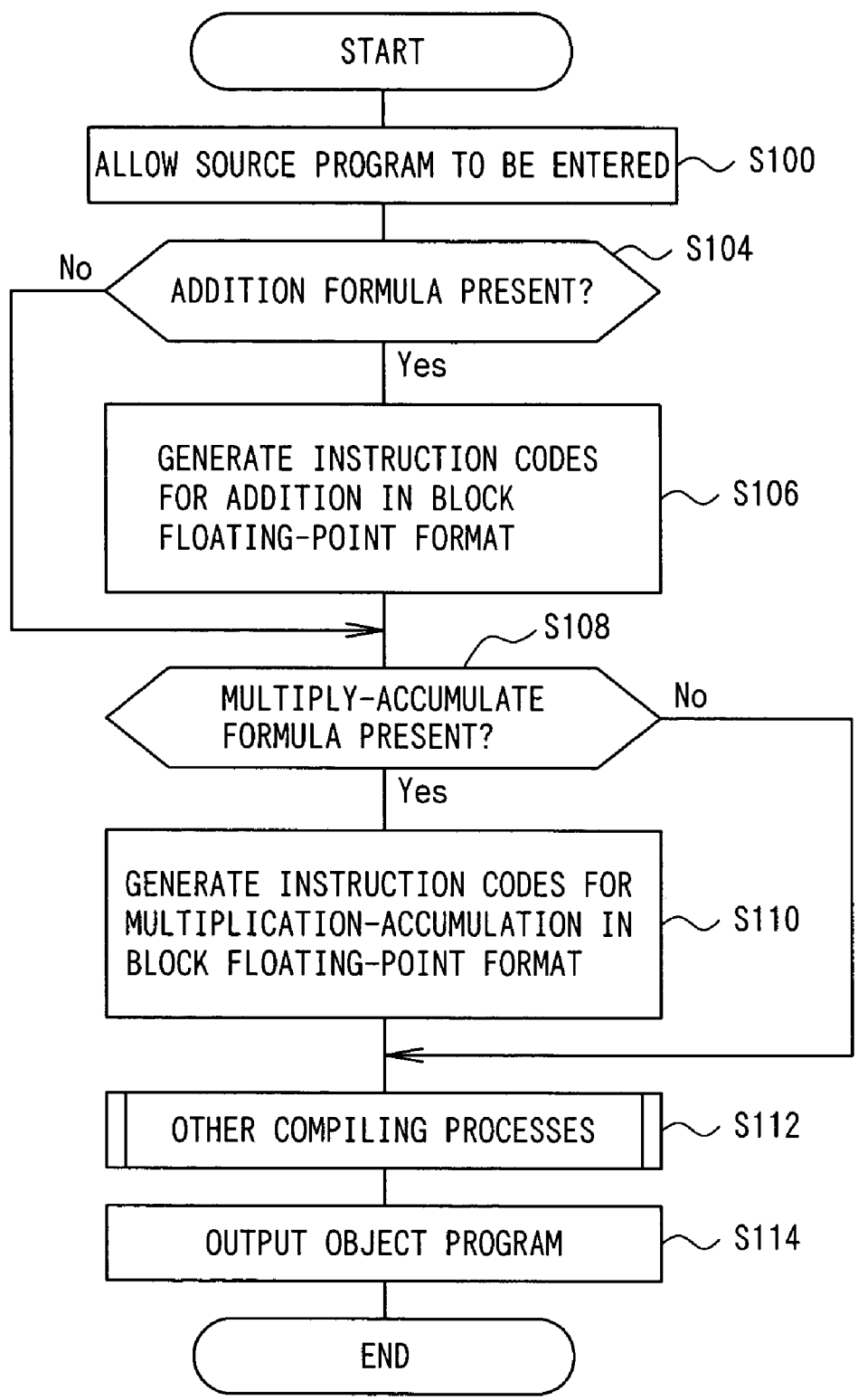
FIG. 3 is a flowchart showing a block floating compiling process.

The CPU 30 consists of a microprocessing unit (MPU), etc. It starts a predetermined program stored in a predetermined area of the ROM 32 and performs a block floating compiling process in a flowchart of FIG. 3 according to the program. FIG. 3 is a flowchart showing the block floating compiling process.

The block floating compiling process is the process of compiling a given source program when the source program contains computing expressions written using block floating variables. It is performed by the CPU 30, beginning with Step S100 as shown in FIG. 3.

In Step S100, the CPU 30 is fed the source program, performs lexical, syntactic, and semantic analyses, and stores the analysis results in the form of an intermediate language, symbol table, or the like. Then, it goes to Step S104.

In Step S104, the CPU 30 checks the analysis results obtained in Step S100 to see whether there are computing expressions which involve addition. If it is found that there are computing expressions which involve addition (Yes), the CPU 30 goes to Step S106, where it expands that part of the computing expressions in the analysis results which involves addition into instruction codes which specify addition for data blocks corresponding to a plurality of block floating variables to be subjected to addition. Incidentally, the process specified by the instruction codes produced in Step S106 will be described concretely later.

Then, the CPU 30 goes to Step S108, where it checks the analysis results obtained in Step S100 to see whether there are computing expressions which involve multiplication-accumulation. If it is found that there are computing expressions which involve multiplication-accumulation (Yes), the CPU 30 goes to Step S100, where it expands that part of the computing expressions in the analysis results which involves multiplication-accumulation into instruction codes which specify multiplication-accumulation for data blocks corresponding to a plurality of block floating variables to be subjected to multiplication-accumulation. Incidentally, the process specified by the instruction codes produced in Step S110 will be described concretely later.

Then, the CPU 30 goes to Step S112, where it performs compiling processes other than those performed in Steps S104 to S110. Then, it goes to Step S114, where it embeds the instruction codes produced at Steps S106 and S110 in an object program to be generated, outputs the object program, and thereby ends the sequence of processes.

On the other hand, if it is found in Step S104 that there is no computing expression which involves addition in the loaded program lines (No), the CPU 30 goes to Step S108.

On the other hand, if it is found in Step S108 that there is no computing expression which involves multiplication-accumulation (No), the CPU 30 goes to Step S112.

Figure 4:
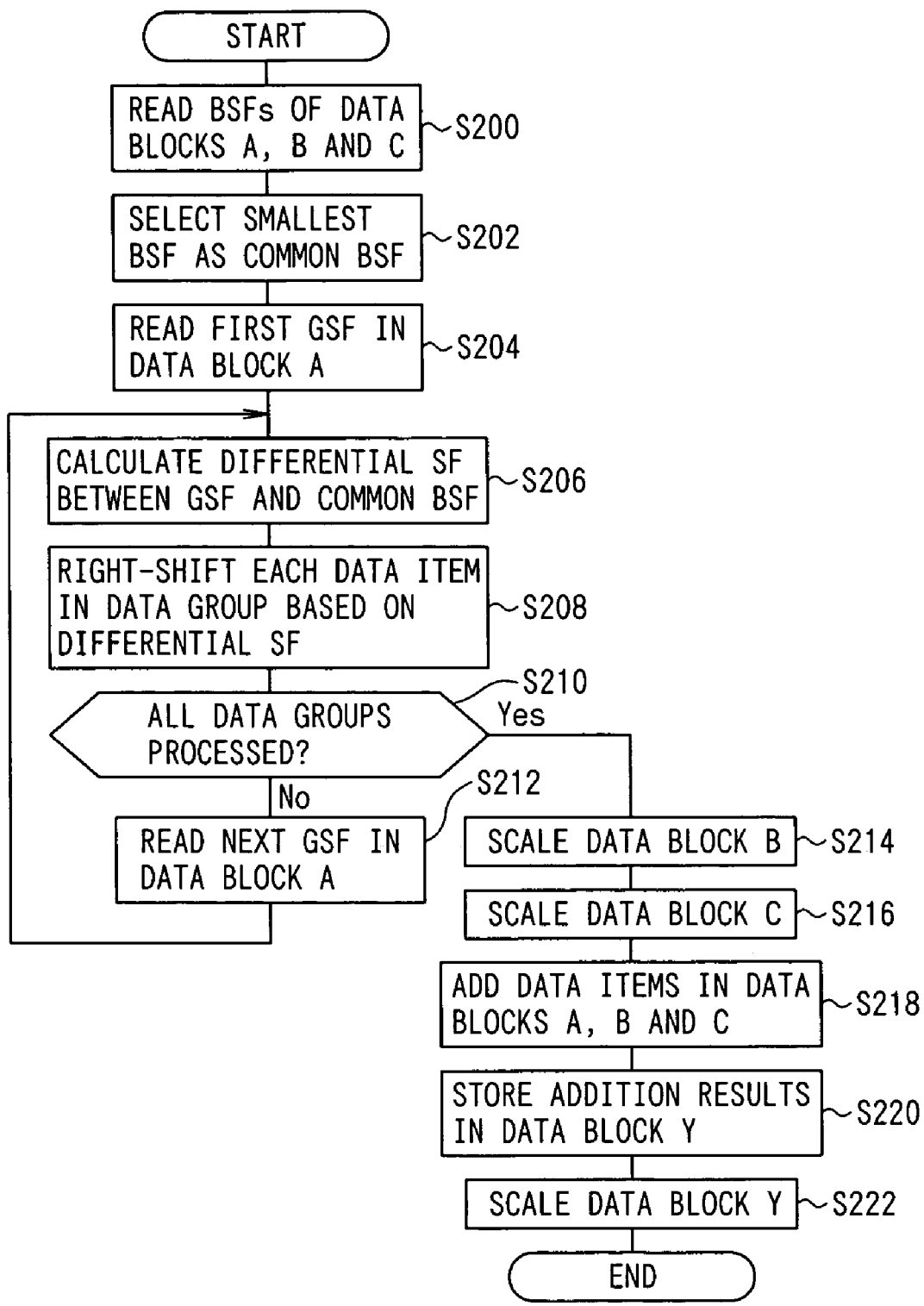
FIG. 4 is a flowchart showing an example of the process specified by the instruction codes produced in Step S106.

Next, the process specified by the instruction codes produced in Step S106 will be described in detail with reference to FIG. 4. FIG. 4 is a flowchart showing an example of the process specified by the instruction codes produced in Step S106.

The process specified by the instruction codes constitutes part of the object program and results from expanding that part of the computing expressions in block floating-point format which involves addition. It is performed by a DSP, beginning with Step S200 as shown in FIG. 4. Incidentally, FIG. 4 shows compilation results obtained when an addition formula contained in a source program and given by Equation (4) below is expanded. In Equation (4), A, B, C, and Y are block floating variables. In the object program, the block floating variables A, B, and C correspond to data blocks A, B, and C, respectively.

$$Y=A+B+C \quad (4)$$

In Step S200, the DSP loads the block scale factors of the data blocks A, B, and C. Then, in Step S202, from among the loaded block scale factors, the DSP selects the block scale factor of the data block containing data with the maximum absolute value as a common block scale factor. Then, the DSP goes to Step S204.

In Step S204, the DSP loads the first group scale factor in the data block A. Then, in Step S206, the DSP calculates a differential scale factor consisting of the difference between the loaded group scale factor and the common block scale factor. Then, in Step S208, the DSP right-shifts each data item in the data group by a shift amount equivalent to the calculated differential scale factor. Then, the DSP goes to Step S210.

In Step S210, the DSP judges whether all the data groups in the data block A have gone through the processes of Steps S106 and S108. If it is found that all the data groups have been processed (Yes), the DSP goes to Step S214. Otherwise (No), it goes to Step S212, where it loads the next group scale factor in the data block A, and then it goes to Step S206.

In Step S214, the DSP performs scaling of the data block B in the same manner as in Steps S204 to S212. In Step S216, the DSP performs scaling of the data block C in the same manner as in Steps S204 to S212. Then, the DSP goes to Step S218.

In Step S218, the DSP adds the data in the data blocks A, B, and C. In Step S220, the DSP stores the results of addition produced at Step S218 in a data block Y. Then, in Step S222, the DSP normalizes the data in the data block Y, and thereby ends the sequence of processes.

Incidentally, the normalization in Step S222 involves selecting the data with the maximum absolute value in a data group, calculating the number of consecutive 0's starting with the highest-order bit, designating this number as a group scale factor, and left-shifting each data item in the data group by a shift amount equivalent to the group scale factor. This process is referred to as group normalization and is performed on every data group in the data block. When normalization of all the data groups is finished, the smallest of the group scale factors is designated as the block scale factor. This sequence of processes is referred to as block normalization or simply as normalization. This also applied to Step S338.

Figure 5:
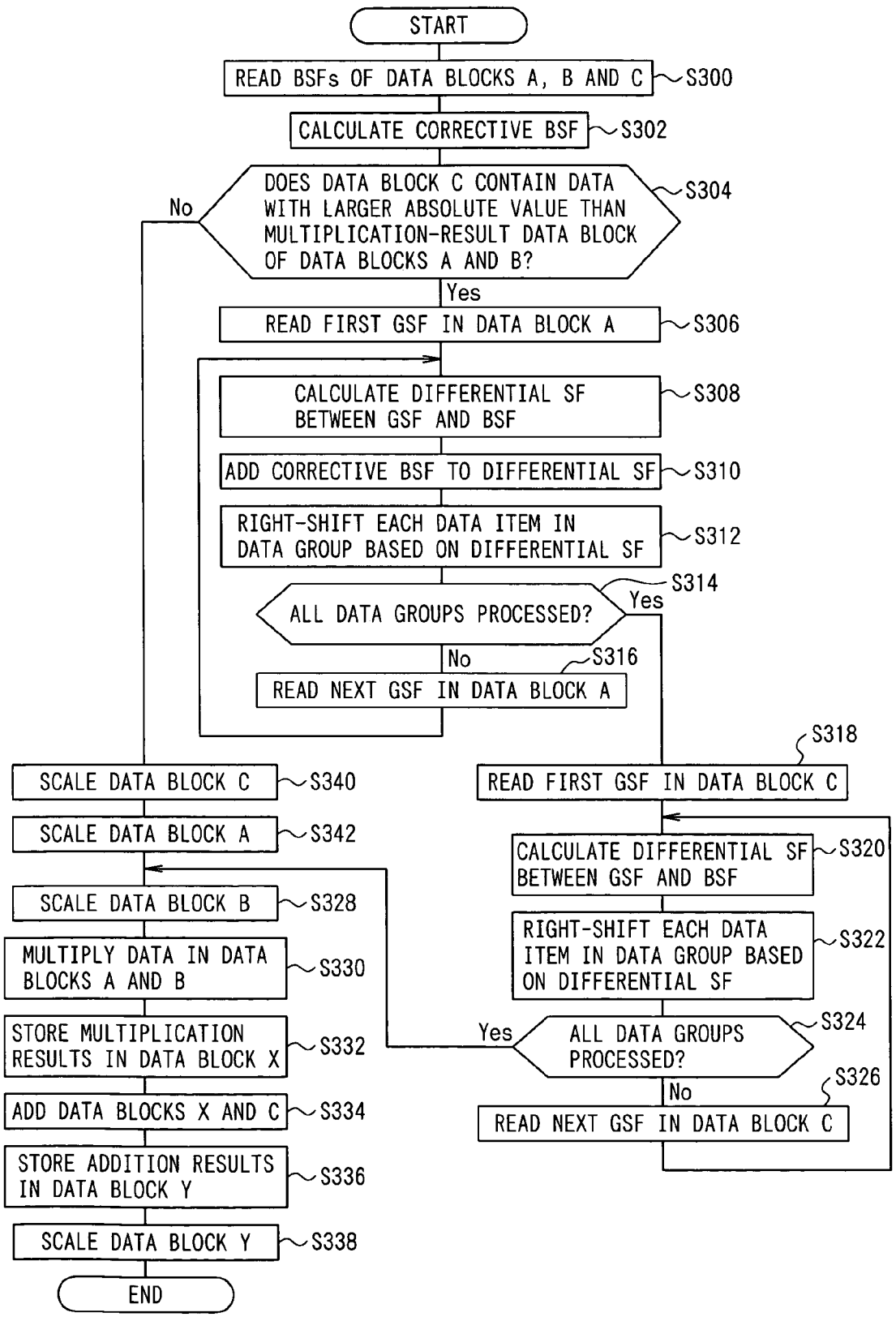
FIG. 5 is a flowchart showing an example of the process specified by the instruction codes produced in Step S110.

Next, the process specified by the instruction codes produced in Step S110 above will be described in detail with reference to FIG. 5. FIG. 5 is a flowchart showing an example of the process specified by the instruction codes produced in Step S110.

The process specified by the instruction codes constitutes part of the object program and results from expanding that part of the computing expressions in block floating-point format which involves multiplication-accumulation. It is performed by the DSP, beginning with Step S300 as shown in FIG. 5. Incidentally, FIG. 5 shows compilation results obtained when a multiply-accumulate formula which serves as a basic arithmetic unit and is given by Equation (6) below is expanded to implement an exponential expression given by Equation (5). In Equations (5) and (6), S, $A_i$, $B_i$, A, B, C, and Y are block floating variables. In the object program, the block floating variables A, B, and C correspond to data blocks A, B, and C, respectively. $1S=1A_i.\text{times}.B_i$ (5) $Y=A_i.\text{times}.B_i+C_i-1C_i=Y$ (6)

In Step S300, the DSP loads the block scale factors of the data blocks A, B, and C. In Step S302, the DSP calculates a corrective block scale factor which is a difference between a multiplication-result block scale factor and the block scale factor of the data block C, the multiplication-result block scale factor being the sum of the block scale factors of the data blocks A and B. In Step S304, based on the sign of the corrective block scale factor, the DSP judges whether the data block C contains data with a larger absolute value than the multiplication-result data block of data blocks A and B. If it is found that the data block C contains data with a larger absolute value (Yes), the DSP goes to Step S306.

In Step S306, the DSP loads the first group scale factor in the data block A. In Step S308, the DSP calculates a differential scale factor consisting of the difference between the loaded group scale factor and the block scale factor of the data block A. In Step S310, the DSP adds the corrective block scale factor to the calculated differential scale factor. In Step S312, the DSP right-shifts each data item in the data group by a shift amount equivalent to the differential scale factor plus the corrective block scale factor. Then, the DSP goes to Step S314.

In Step S314, the DSP judges whether all the data groups in the data block A have gone through the processes of Steps S308 to S312. If it is found that all the data groups have been processed (Yes), the DSP goes to Step S318. Otherwise (No), it goes to Step S316, where it loads the next group scale factor in the data block A, and then it goes to Step S308.

In Step S318, the DSP loads the first group scale factor in the data block C. In Step S320, the DSP calculates a differential scale factor consisting of the difference between the loaded group scale factor and the block scale factor of the data block C. In Step S322, the DSP right-shifts each data item in the data group by a shift amount equivalent to the calculated differential scale factor. Then, the DSP goes to Step S324.

In Step S324, the DSP judges whether all the data groups in the data block C have gone through the processes of Steps S320 and S322. If it is found that all the data groups have been processed (Yes), the DSP goes to Step S328. Otherwise (No), it goes to Step S326, where it loads the next group scale factor in the data block C, and then it goes to Step S320.

In Step S328, the DSP performs scaling of the data block B in the same manner as in Steps S318 to S326. In Step S330, the DSP multiplies the data in the data blocks A and B. In Step S332, the DSP stores the multiplication results produced at Step S330 in a data block X. Then, the DSP goes to Step S334.

In Step S334, the DSP adds the data in the data blocks X and C. In Step S336, the DSP stores the results of addition produced at Step S334 in a data block Y. Then, in Step S338, the DSP normalizes the data in the data block Y, and thereby ends the sequence of processes.

On the other hand, if it is found in Step S304 that the data block C does not contain data with a larger absolute value (No), the DSP goes to Step S340, where it performs scaling of the data block C in the same manner as in Steps S306 to S316. Then, in Step S342, the DSP performs scaling of the data block A in the same manner as in Steps S318 to S326. Then, the DSP goes to Step S328.

Next, operation of the above embodiment will be described.

First, description will be given of procedures for compiling a source program which describes the addition formula given by Equation (4).

On the computer 100, when the user provides the source program which describes the addition formula given by Equation (4), the CPU 30 goes through Steps S100, S104, and S106 to detect computing expressions for addition in the provided source program and expand that part of the detected computing expressions which involves addition into instruction codes which specify addition for data blocks corresponding to a plurality of block floating variables to be subjected to addition. Then, the CPU 30 goes through Step S114 to embed the instruction codes in the object program to be generated and output the object program.

Thus, when the object program is executed, the CPU 30 goes through Steps S200 and S202 to select the block scale factor of the data block containing data with the maximum absolute value from among the block scale factors of the data blocks A, B, and C as a common block scale factor in relation to that part of the computing expressions which involves addition. Then, the CPU 30 goes through Steps S204 to S222 to scale data in the data groups in each of the data blocks A, B, and C based on scale factors consisting of differences between the group scale factors of the respective data groups and the common block scale factor and perform addition on the scaled data in the data blocks A, B, and C.

Next, description will be given of procedures for compiling a source program which describes the multiply-accumulate formula given by Equation (6).

On the computer 100, when the user provides the source program which describes the multiply-accumulate formula given by Equation (6), the CPU 30 goes through Steps S100, S108, and S110 to detect computing expressions for multiplication-accumulation in the provided source program and expand that part of the detected computing expressions which involves multiplication-accumulation into instruction codes which specify multiplication-accumulation for the data blocks A and B that correspond to two block floating variables to be subjected to multiplication-accumulation and the data block C that corresponds to a block floating variable to be subjected to addition. Then, the CPU 30 goes through Step S114 to embed the instruction codes in the object program to be generated and output the object program.

Thus, when the object program is executed, the CPU 30 goes through Steps S300 to S304 to calculate a corrective block scale factor consisting of the difference between a multiplication-result block scale factor and the block scale factor of the third data block in relation to that part of the computing expressions which involves multiplication-accumulation and perform either a first scale correction process or second scale correction process.

The first scale correction process is performed when the data block C contains data with a larger absolute value. In the first scale correction process, the CPU 30 repeats Steps S308 to S316 to calculate a differential scale factor consisting of the difference between the group scale factor of each data group in the data block A and the block scale factor of the data block A and right-shift each data item in the data group by a shift amount equivalent to the calculated differential scale factor plus the corrective block scale factor. Also, the CPU 30 repeats Steps S318 to S326 to calculate a differential scale factor consisting of the difference between the group scale factor of each data group in the data block B and the block scale factor of the data block B and right-shift each data item in the data group by a shift amount equivalent to the calculated differential scale factor. Then, the CPU 30 goes through Steps S330 and S332 to multiply the data in the data blocks A and B and store the multiplication results in the data block X. Thus, the data in the data block X are corrected by means of scaling with respect to the data block A before multiplication so that their digit places will be aligned with those of the data in the data block C.

Also, the CPU 30 goes through Step S328 to calculate a differential scale factor consisting of the difference between the group scale factor of each data group in the data block C and the block scale factor of the data block C and right-shift each data item in the data group by a shift amount equivalent to the calculated differential scale factor. Then, the CPU 30 goes through Steps S334 to S338 to add the data in the data blocks X and C with their digit places aligned.

On the other hand, the second scale correction process is performed when the data block C does not contain data with a larger absolute value. In the second scale correction process, the CPU 30 goes through Step S342 to calculate a differential scale factor consisting of the difference between the group scale factor of each data group in the data block A and the block scale factor of the data block A and right-shift each data item in the data group by a shift amount equivalent to the calculated differential scale factor. Also, the CPU 30 goes through Step S328 to similarly perform scaling of the data block B. Then, the CPU 30 goes through Steps S330 and S332 to multiply the data in the data blocks A and B and store the multiplication results in the data block X.

Also, the CPU 30 goes through Step S340 to calculate a differential scale factor consisting of the difference between the group scale factor of each data group in the data block C and the block scale factor of the data block C and right-shift each data item in the data group by a shift amount equivalent to the calculated differential scale factor. Thus, the data in the data block C are corrected by means of scaling with respect to the data block C before multiplication so that their digit places will be aligned with those of the data in the data block X. Then, the CPU 30 goes through Steps S334 to S338 to add the data in the data blocks X and C with their digit places aligned.

In this way, when this embodiment is fed a source program containing computing expressions written using block floating variables, it detects computing expressions for addition in the source program, expands that part of the detected computing expressions which involves addition into instruction codes which specify addition for data blocks corresponding to a plurality of block floating variables to be subjected to addition, embeds the instruction codes in the object program to be generated, and outputs the object program.

This makes it possible to implement addition in block floating-point format by simply implementing addition formulas using block floating variables without any special programming operation such as defining a structure or creating a special function in the source program. This makes it easier to describe arithmetic operations in source programs and simpler to write the source programs.

Furthermore, according to this embodiment, the process specified by the instruction codes produced as a result of compiling an addition formula involves selecting the block scale factor of the data block containing data with the maximum absolute value from among the block scale factors of plural data blocks as a common block scale factor, scaling data in the data groups in each of the data blocks based on scale factors consisting of differences between the group scale factors of the respective data groups and the common block scale factor, and performing addition on the scaled data in the data blocks.

This makes it possible to normalize data within each data block and across data blocks at the same time by performing scaling once per data item in an execution process of an object program, and thus relatively simplify arithmetic processing.

Furthermore, when this embodiment is fed a source program containing computing expressions written using block floating variables, it detects computing expressions for multiplication-accumulation in the source program, expands that part of the detected computing expressions which involves multiplication-accumulation into instruction codes which specify multiplication-accumulation for a first data block and second data block which correspond to two block floating variables to be subjected to multiplication and a third data block which corresponds to a block floating variable to be subjected to addition, and embeds the instruction codes in the object program to be generated, and outputs the object program.

This makes it possible to implement multiplication-accumulation in block floating-point format by simply describing multiply-accumulate formulas using block floating variables without any special programming operation such as defining a structure or creating a special function in the source program. This makes it easier to describe arithmetic operations in source programs and simpler to write the source programs.

Furthermore, according to this embodiment, the process specified by the instruction codes produced as a result of compiling a multiply-accumulate formula involves calculating a corrective block scale factor, calculating a differential scale factor consisting of the difference between the group scale factor of each data group in the first data block and the block scale factor of the first data block before multiplication when the block scale factor of the third data block is larger than the multiplication-result block scale factor, and right-shifting each data item in the data group based on the differential scale factor plus the corrective block scale factor.

Thus, in an execution process of an object program, scaling is performed before multiplication. This eliminates the need to assign an extra bit length to variables to avoid cancellation of significant digits, and thus relatively reduces data capacity required for arithmetic operations. Also, this relatively decreases the possibility of lowering computational efficiency because no bit length conversion is involved.

Incidentally, as shown in FIG. 2, the above embodiment has adopted a data structure in block floating-point format according to which k data items are organized into a data group and two or more data groups are organized into a data block, which contains the group scale factors of individual data groups and the block scale factor of the data block, but this is not restrictive and it is also possible to adopt a data structure which does not contain any data group or group scale factor. According to such a data structure, a data block is composed of two or more data items and contains a block scale factor. Such a data structure operates in the same manner and offers the same effects as the above embodiment.

Besides, in the above embodiment, the process shown in FIG. 4 has been cited as an example of the process which constitutes part of the object program and results from expanding that part of the computing expressions in block floating-point format which involves addition. In this case, since the scaling and addition of the data blocks A, B, and C are separate from each other, the results of scaling must be saved once in memory or the like. The following processes may be employed alternatively.

A first process involves performing a sequence of processes on all the data groups in the data blocks A, B, and C, where the sequence of processes consists of scaling of data within each data group in the data block A, scaling of data within each data group in the data block B, scaling of data within each data group in the data block C, addition of data in these data groups, and normalization of the results of addition.

A second process involves performing a sequence of processes on all the data groups in the data blocks A, B, and C, where the sequence of processes consists of scaling of data within each data group in the data block A, scaling of data within each data group in the data block B, addition of data in these data groups, scaling of data within each data group in the data block C, addition of the scaled data in the data group in the data block C to the addition results of the data groups in the data blocks A and B, and normalization of the results of addition.

This makes it possible to perform arithmetic operations without storing data in memory or the like, and thereby improve computational efficiency.

Besides, although what is compiled in the above embodiment is an addition formula and multiply-accumulate formula in block floating-point format, this is not restrictive and it is also possible to compile a multiplication formula in block floating-point format. For example, a source program such as the one shown in FIG. 6 may be compiled into an object program such as the one shown in FIG. 7.

The source program in FIG. 6 implements a multiplication formula given by Equation (7) below and consists of processes in Steps S400 to S410 as shown in FIG. 6. FIG. 6 shows a source program which describes a multiplication formula in block floating-point format. Incidentally, unlike the above embodiment, according to this data structure in block floating-point format, a data block contains two or more data items and a block scale factor, but no data group.

$$r = a.times.b.times.c \qquad (7)$$

Steps S400 and S402 are global functions. Step S400 defines the number of data items in a data block and Step S402 secures block floating variables a, b, c, and r.

Steps S404 to S410 are local functions. Step S404 secures a variable i of an integer type, Step S406 performs an arithmetic operation "r=a.times.b" on each data item in the block floating variables a, b, and r, and Step S408 performs an arithmetic operation "r=r.times.c" on each data item in block floating variables c and r. Then, in Step S410, the sequence of processes is finished and the processing returns to the beginning.

The object program in FIG. 7 results from compiling the source program shown in FIG. 6 and consists of processes in Steps S500 to S520 as shown in FIG. 7. FIG. 7 shows the object program obtained by compiling the source program shown in FIG. 6.

Steps S500 and S502 are global functions. Step S500 defines the number of data items in a data block and Step S502 secures data blocks a, b, c, and r which correspond to block floating variables a, b, c, and r.

Steps S504 to S520 are local functions. Step S504 initializes registers, Step S506 calculates a multiplication-result block scale factor by adding the block scale factors of the data blocks a and b, and Step S508 sets pointers to the data blocks a, b, and r.

Step S510 performs an arithmetic operation "r=a.times.b" on each data item in the data blocks a, b, and r. This arithmetic operation involves reading each data item in the data block a with the data item right-shifted by a shift amount equivalent to the block scale factor of the data block a (specified by function bfp_load_man (*P0++M1, SFB0)) reading each data item in the data block b with the data item right-shifted by a shift amount equivalent to the block scale factor of the data block b (specified by function bfp_load_man(*P1++M1, SFG1)), multiplying the data items in data blocks a and b by each other, and storing the multiplication results in the data block r.

Step S512 stores the multiplication-result block scale factor calculated at Step S506 in the block scale factor of the data block r. Steps S514 to S520 perform an arithmetic operation "r=r.times.c" on data blocks c and r in the same manner as Steps 506 to S512.

Besides, although in the example described above, all the variables a, b, c, and r are block floating variables, this is not restrictive and it is also possible to implement arithmetic operations for a mixture of block floating variables and fixed-point variables. For example, a source program such as the one shown in FIG. 8 may be compiled into an object program such as the one shown in FIG. 9.

The source program in FIG. 8 implements a multiplication formula given by Equation (7) above and consists of processes in Steps S600 to S610 as shown in FIG. 8. FIG. 8 shows a source program which describes a multiplication formula in block floating-point format. Incidentally, unlike the above embodiment, according to this data structure in block floating-point format, a data block contains two or more data items and a block scale factor, but no data group.

Steps S600 and S602 are global functions. Step S600 defines the number of data items in a data block and Step S602 secures the block floating variables a, b, and r and a fixed-point variable c.

Steps S604 to S610 are local functions. Step S604 secures a variable i of an integer type, Step S606 performs an arithmetic operation "r=a.times.b" on each data item in the block floating variables a, b, and r, and Step S608 performs an arithmetic operation "r=r.times.c" on each data item in the block floating variable a and fixed-point variable c. Then, in Step S610, the sequence of processes is finished and the processing returns to the beginning.

The object program in FIG. 9 results from compiling the source program shown in FIG. 8 and consists of processes in Steps S700 to S720 as shown in FIG. 9. FIG. 9 shows the object program obtained by compiling the source program shown in FIG. 8.

Steps S700 and S702 are global functions. Step S700 defines the number of data items in a data block and Step S702 secures data blocks a, b, and r which correspond to the block floating variables a, b, and r as well as secures a fixed-point array c which corresponds to the fixed-point variable c.

Steps S704 to S720 are local functions. Step S704 initializes registers, Step S706 calculates a multiplication-result block scale factor by adding the block scale factors of the data blocks a and b, and Step S708 sets pointers to the data blocks a, b, and r.

Step S710 performs an arithmetic operation "r=a.times.b" on each data item in the data blocks a, b, and r. This arithmetic operation involves reading each data item in the data block a with the data item right-shifted by a shift amount equivalent to the block scale factor of the data block a (specified by function bfp_load_man(*P0++M1,SFB0)), reading each data item in the data block b with the data item right-shifted by a shift amount equivalent to the block scale factor of the data block b (specified by function bfp_load_man(*P1++M1, SFB1)), multiplying the data items in data blocks a and b by each other, and storing the multiplication results in the data block r.

Step S712 stores the multiplication-result block scale factor calculated at Step S706 in the block scale factor of the data block r.

Step S714 calculates the block scale factor of the data block r as a multiplication-result block scale factor and Step S716 sets a pointer to the data block r and pointer to the fixed-point array c.

Step S718 performs an arithmetic operation "r=r.times.c" on each data item in the data block r and fixed-point array c. This arithmetic operation involves reading each data item in the data block r with the data item right-shifted by a shift amount equivalent to the block scale factor of the data block r (specified by function bfp_load_man(*P0++M1,SF−B0)), reading each data item in the fixed-point array c without a data shift (specified by function load_man(*P1++M1)), multiplying the data items in data block a and fixed-point array c, and storing the multiplication results in the data block r.

Step S720 stores the multiplication-result block scale factor calculated at Step S714 in the block scale factor of the data block r.

Besides, what is compiled in the above embodiment is an addition formula and multiply-accumulate formula in block floating-point format. Regarding compilation of a multiply-accumulate formula, more specifically, it is also possible to compile a source program such as the one shown in FIG. 10 into an object program such as the one shown in FIG. 11.

The source program in FIG. 10 implements a multiply-accumulate formula given by Equation (8) below and consists of processes in Steps S800 to S806 as shown in FIG. 10. FIG. 10 shows a source program which describes a multiply-accumulate formula in block floating-point format. Incidentally, this data structure in block floating-point format is the same as that of the above embodiment.

$$r(n) = k=0 K a(k) b(n-k) nN \qquad (8)$$

Step S800 secures the block floating variables a, b, and r and Step S802 repeats the processes of Steps S804 and S806 N+1 times. Step S804 initializes data r(n) and Step S806 performs the arithmetic operation of Equation (8) on each data item in the block floating variables a and b. Then, the sequence of processes is finished and the processing returns to the beginning.

Figure 11:
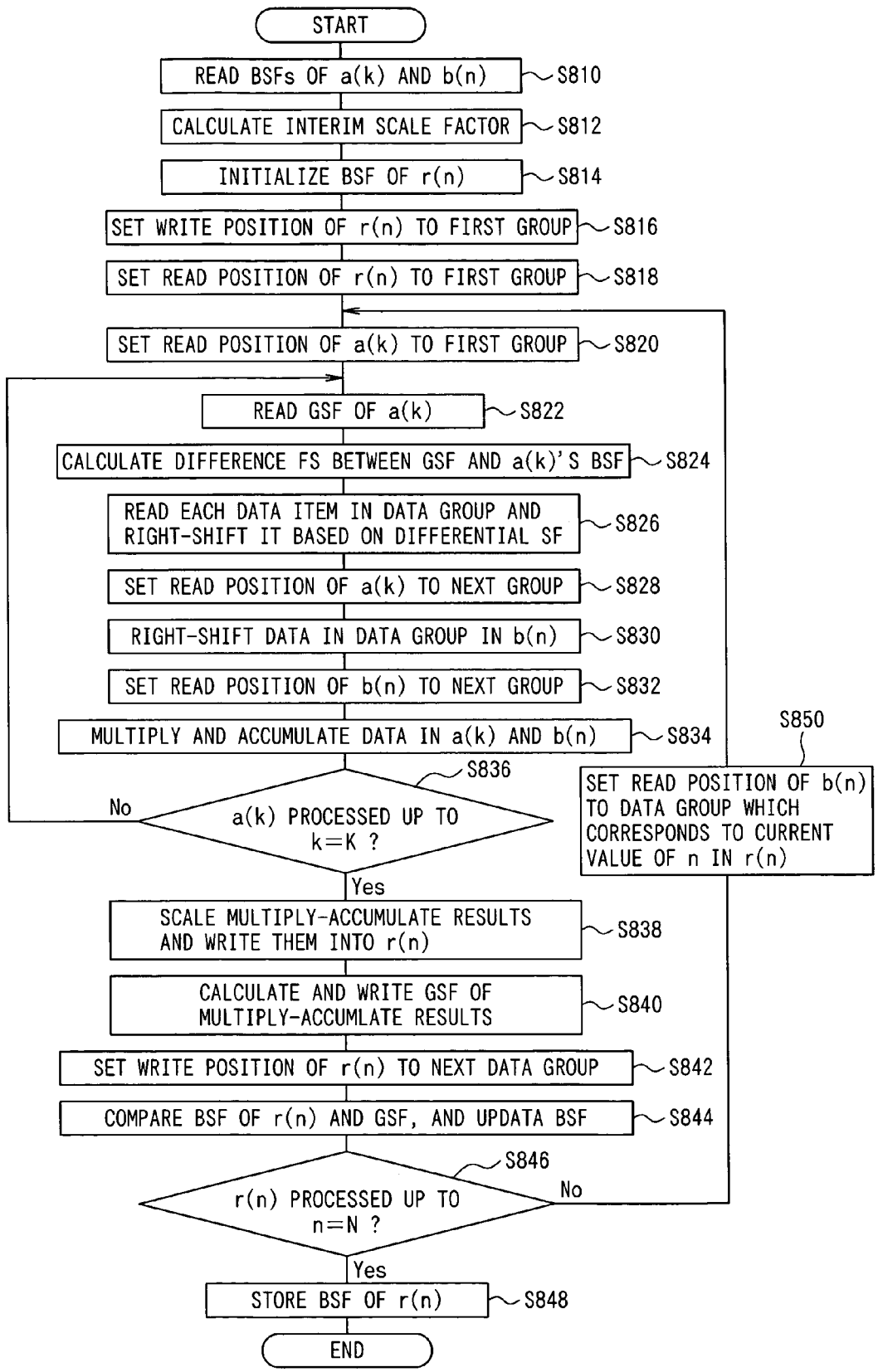
FIG. 11 shows an object program obtained by compiling the source program shown in FIG. 10.

The object program in FIG. 11 results from compiling the source program shown in FIG. 10 and consists of processes in Steps S810 to S850 as shown in FIG. 11. FIG. 11 shows the object program obtained by compiling the source program shown in FIG. 10.

In Step S810, the object program reads the block scale factors of data blocks a(k) and b(n). In Step S812, the object program calculates the sum of the block scale factors of the two data blocks as an interim scale factor. In Step S814, the object program initializes the block scale factor of the data block r(n) to a value determined from the data with the minimum absolute value and the interim scale factor (e.g., the sum of the two). Then, the object program goes to Step S816.

In Step S816, the object program sets write position of the data block r(n) to the first data group. In Step S818, the object program sets read position of the data block b(n) to the first data group. In Step S820, the object program sets read position of the data block a(k) to the first data group. In Step S822, the object program reads the group scale factor of the data block a (k). Then, the object program goes to Step S824.

In Step S824, the object program calculates the differential scale factor between the group scale factor and the block scale factor of the data block a(k). In Step S826, the object program reads each data item in the data group and right-shifts it based on the differential scale factor. In Step S828, the object program sets the read position of the data block a(k) to the next data group. In Step S830, the object program right-shifts the data in the data group in the data block b(n) (the same process as in Steps S822 to S826). Then, the object program goes to Step S832.

In Step S832, the object program sets the read position of the data block b(n) to the next data group. In Step S834, the object program multiplies and accumulates the data in the data blocks a(k) and b(n). In Step S836, the object program judges whether a(k) has been processed up to k=K. If it is found that a(k) has been processed up to k=K (Yes), the object program goes to Step S838, where it scales the multiply-accumulate results, writes them into the data block r(n), and then goes to Step S840.

In Step S840, the object program calculates and writes the group scale factor of the multiply-accumulate results based on the number of shifts needed during the scaling and the interim scale factor (e.g., the sum of the two). In Step S842, the object program sets the write position of the data block r(n) to the next data group. In Step S844, the object program compares the block scale factor of the data block r(n) and the group scale factor and updates the block scale factor to the scale factor which contains the data with the maximum absolute value. Then, the object program goes to Step S846.

In Step S846, the object program judges whether r(n) has been processed up to n=N. If it is found that r (n) has been processed up to n=N (Yes), the object program goes to Step S848, where it stores the block scale factor of the data block r(n). Then, the object program finishes the sequence of processes and returns the processing to the beginning.

On the other hand, if it is found in Step S846 that r(n) has not been processed up to n=N (No), the object program goes to Step S850, where it sets the read position of the data block b(n) to the data group which corresponds to the current value of n in the data block r(n). Then, the object program goes to Step S820.

On the other hand, if it is found in Step S836 that a(k) has not been processed up to k=K (No), the object program goes to Step S822.

Besides, although in the example described above, all the variables a, b, and r are block floating variables, this is not restrictive and it is also possible to implement arithmetic operations for a mixture of block floating variables and fixed-point variables. For example, a source program such as the one shown in FIG. 12 may be compiled into an object program such as the one shown in FIG. 13.

The source program in FIG. 12 implements a multiply-accumulate formula given by Equation (9) below and consists of processes in Steps S900 to S906 as shown in FIG. 12. FIG. 12 shows a source program which describes a multiply-accumulate formula in block floating-point format. 3r(n)=k=0Ka(k)b(n−k)nN(9)

Step S900 secures a fixed-point variable a and block floating variables b and r, and Step S902 repeats the processes of Steps S904 and S906 N times. Step S904 initializes data block r(n) and Step S906 performs the arithmetic operation of Equation (9) on each data item in the fixed-point variable a and block floating variable b. Then, the sequence of processes is finished and the processing returns to the beginning.

Figure 13:
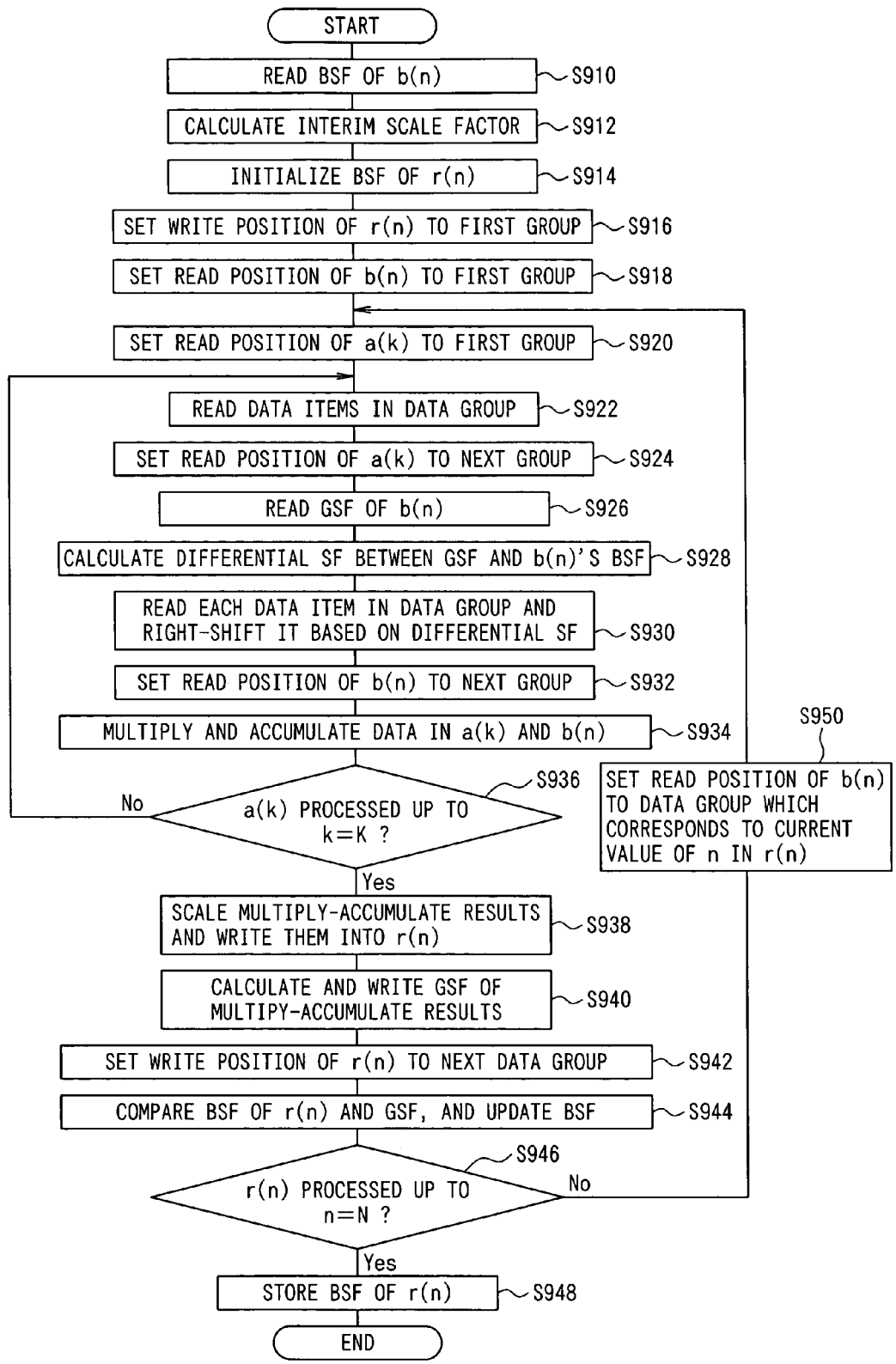
FIG. 13 shows an object program obtained by compiling the source program shown in FIG. 12.

The object program in FIG. 13 results from compiling the source program shown in FIG. 12 and consists of processes in Steps S910 to S950 as shown in FIG. 13. FIG. 13 shows the object program obtained by compiling the source program shown in FIG. 12.

In Step S910, the object program reads the block scale factors of data block and b(n). In Step S912, the object program calculates the block scale factor as an interim scale factor. In Step S914, the object program initializes the block scale factor of the data block r (n) to a value determined from the data with the minimum absolute value and the interim scale factor (e.g., the sum of the two). Then, the object program goes to Step S916.

In Step S916, the object program sets write position of the data block r(n) to the first data group. In Step S918, the object program sets read position of the data block b(n) to the first data group. In Step S920, the object program sets read position of the data block a(k) to the first data group. In Step S922, the object program reads the data items in the data group. Then, the object program goes to Step S924.

In Step S924, the object program sets the read position of the data block a(k) to the next data group. In Step S926, the object program reads the group scale factor of the data block b(n). In Step S928, the object program calculates the differential scale factor between the group scale factor and the block scale factor of the data block b (n). In Step S930, the object program reads each data item in the data group and right-shifts it based on the differential scale factor. Then, the object program goes to Step S932.

In Step S932, the object program sets the read position of the data block b(n) to the next data group. In Step S934, the object program multiplies and accumulates the data in the data blocks a(k) and b(n). In Step S936, the object program judges whether a(k) has been processed up to k=K. If it is found that a(k) has been processed up to k=K (Yes), the object program goes to Step S938, where it scales the multiply-accumulate results, writes them into the data block r(n), and then goes to Step S940.

In Step S940, the object program calculates and writes the group scale factor of the multiply-accumulate results based on the number of shifts needed during the scaling and the interim scale factor (e.g., the sum of the two). In Step S942, the object program sets the write position of the data block r(n) to the next data group. In Step S944, the object program compares the block scale factor of the data block r(n) and the group scale factor and updates the block scale factor to the scale factor which contains the data with the maximum absolute value. Then, the object program goes to Step S946.

In Step S946, the object program judges whether r(n) has been processed up to n=N. If it is found that r(n) has been processed up to n=N (Yes), the object program goes to Step S948, where it stores the block scale factor of the data block r(n). Then, the object program finishes the sequence of processes and returns the processing to the beginning.

On the other hand, if it is found in Step S946 that r(n) has not been processed up to n=N (No), the object program goes to Step S950, where it sets the read position of the data block b(n) to the data group which corresponds to the current value of n in the data block r(n). Then, the object program goes to Step S920.

On the other hand, if it is found in Step S936 that a(k) has not been processed up to k=K (No), the object program goes to Step S922.

Besides, although what is compiled in the above embodiment is a source program which describes an addition formula using block floating variables, this is not restrictive and it is also possible to compile a source program which describes an addition formula using block floating variables and a fixed-point variable as with the above example of multiplication which uses block floating variables and a fixed-point variable (FIGS. 8 and 9).

Besides, although in the above embodiment, a source program which describes an addition formula using block floating variables is compiled to implement addition in block floating-point format, this is not restrictive and it is also possible to compile a source program which describes a subtraction formula using block floating variables in the same manner as in the above embodiment to implement subtraction in block floating-point format.

Also, although in the above embodiment, a source program which describes a multiplication formula using block floating variables is compiled to implement multiplication (multiplication out of multiplication-accumulation) in block floating-point format, this is not restrictive and it is also possible to compile a source program which describes a division formula using block floating variables in the same manner as in the above embodiment to implement division in block floating-point format.

Also, although in the above embodiment, each block floating variable is defined by specifying a variable name, the number of data groups, and the number of data items in each data group as shown in Equation (3), this is not restrictive and it is possible to define block floating variables by specifying only variable names without specifying the number of data groups or the number of data items in each data group if the number of data groups or the number of data items are defined commonly or in a fixed manner. This will make it simpler to write source programs.

Figure 14:
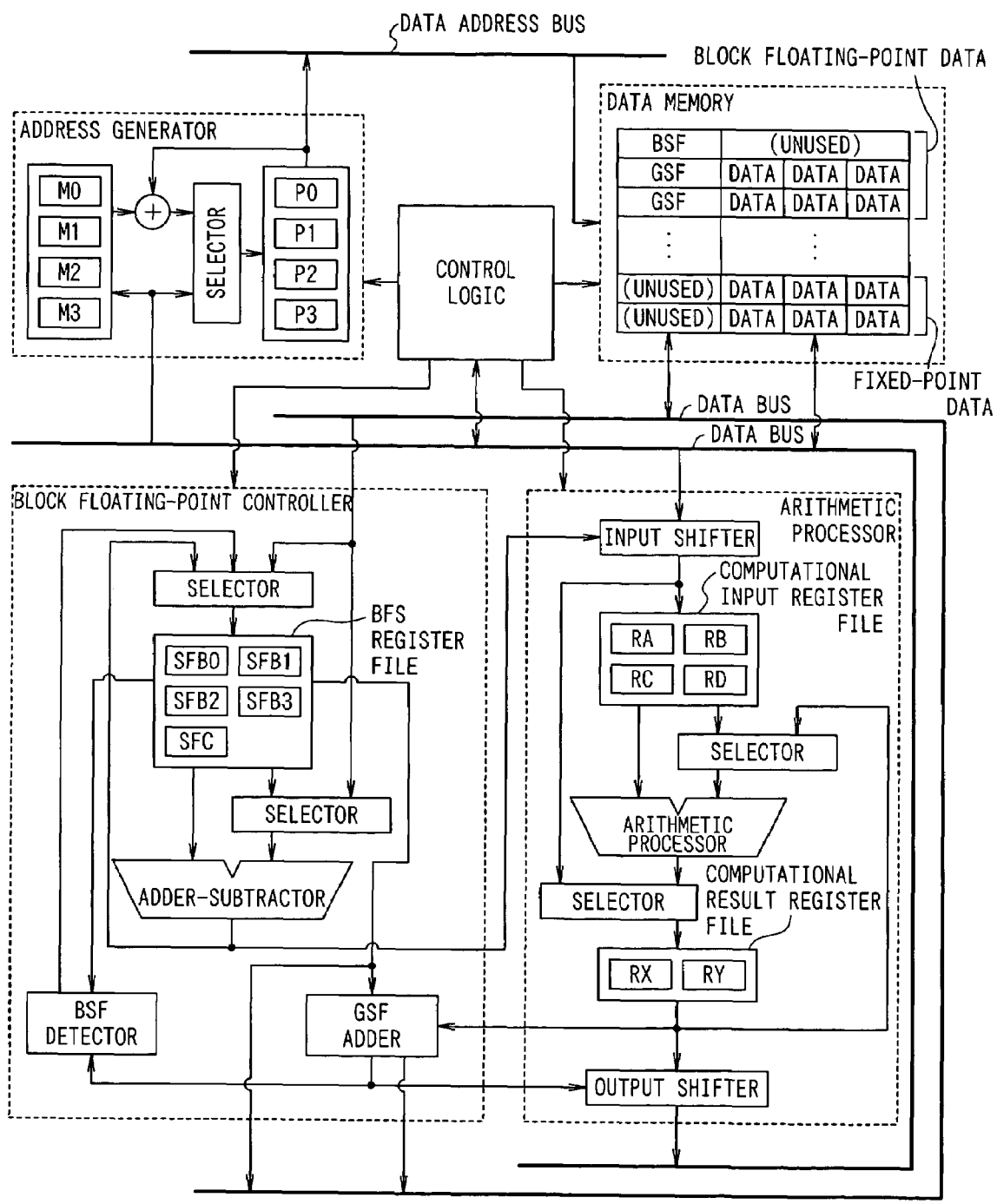
FIG. 14 is a block diagram showing a configuration of a DSP.

Also, although in the above embodiment, the object programs generated are executable by the computer 100, this is not restrictive and an object program executable by a digital signal processor (hereinafter referred to simply as a DSP) such as the one shown in FIG. 14 may be generated on the computer 100. In the example of FIG. 14, an object program compiled on the computer 100 is executed by control logic. FIG. 14 is a block diagram showing a configuration of a DSP.

Also, although in the above embodiment, digit places are aligned by right-shifting each data item in the data block with a smaller block scale factor out of two data blocks to be subjected to addition, this is not restrictive and it is also possible to align digit places by left-shifting each data item in the data block with a larger block scale factor out of two data blocks to be subjected to addition.

Also, although in the above embodiment, the control program prestored in the ROM 32 is executed to implement the processes of the flowchart in FIG. 3, this is not restrictive and it is also possible to run programs of the above procedures by loading them to the RAM 34 from a storage medium which stores the programs.

The storage medium here maybe any storage medium, provided it is computer-readable, regardless of what reading method it uses: electronic, magnetic, or optical. It may be a semiconductor storage medium such as RAM or ROM; magnetic storage medium such as an FD or HD; optical storage medium such as a CD, CDV, LD, or DVD; or magneto-optical storage medium such as an MO.

Also, although in the above embodiment, a compiler apparatus, compiler program, and object program generating method according to the present invention are applied to a case in which a source program containing computing expressions written in block floating-point format is translated on a computer 100 into an object program executable by the computer 100 as shown in FIG. 1, this is not restrictive and they may also be applied to other cases without departing from the spirit and scope of the present invention.

INDUSTRIAL APPLICABILITY

As described above, the compiler apparatus according to an embodiment of the present invention can compile block floating-point variables.

Furthermore, the compiler apparatus according to a further embodiment of the present invention can implement block floating-point operations by simply describing computing expressions using block floating variables without any special programming operation such as defining a structure or creating a special function in the source program. This makes it easier to describe arithmetic operations in source programs and simpler to write the source programs.

Furthermore, the compiler apparatus according to yet another embodiment of the present invention can compile hierarchical block floating-point variables.

Furthermore, the compiler apparatus according to a further embodiment of the present invention can implement block floating-point operations by simply describing computing expressions using block floating variables without any special programming operation such as defining a structure or creating a special function in the source program. This makes it easier to describe arithmetic operations in source programs and simpler to write the source programs.

Furthermore, the compiler apparatus according to an embodiment of the present invention can implement multiplication or division in block floating-point format by simply describing a multiplication formula or division formula using block floating variables without any special programming operation such as defining a structure or creating a special function in the source program. This makes it easier to describe arithmetic operations in source programs and simpler to write the source programs.

Furthermore, the compiler apparatus according to another embodiment of the present invention can implement addition or subtraction in block floating-point format by simply describing an addition formula or subtraction formula using block floating variables without any special programming operation such as defining a structure or creating a special function in the source program. This makes it easier to describe arithmetic operations in source programs and simpler to write the source programs. Also, the compiler apparatus can normalize data within each data block and across data blocks at the same time by performing scaling once per data item in an execution process of an object program, and thus relatively simplify arithmetic processing.

Furthermore, the compiler apparatus according to another embodiment of the present invention can implement multiplication-accumulation in block floating-point format by simply describing multiply-accumulate formulas using block floating variables without any special programming operation such as defining a structure or creating a special function in the source program. This makes it easier to describe arithmetic operations in source programs and simpler to write the source programs. Thus, in an execution process of an object program, scaling is performed before multiplication. This eliminates the need to assign an extra bit length to variables to avoid cancellation of significant digits, and thus relatively reduces data capacity required for arithmetic operations. Also, this relatively decreases the possibility of lowering computational efficiency because no bit length conversion is involved.

The invention claimed is:

1. An object program generating method being able to perform block floating compiling process by using a Central Processing Unit (CPU) for translating a given source program into an object program by performing the block floating compiling process when the source program contains computing expressions which are written using block floating variables of a Block Floating data type, characterized in that:

each of the block floating variables constitutes a data block containing one or more data items and the data block is a variable which represents a data structure containing a block scale factor of the data block, the block floating compiling process by using the CPU comprising:

a computing expression detecting step of detecting the computing expressions in the source program input from the storage device by detecting and outputting as detection results:

operators in the expressions,
the data type of input operand for the operators, and
the data type of output operand for the operators;
a computing expression expanding step of expanding the computing expressions detected in the computing expression detecting step into predetermined instruction codes, the expanding step based upon:
the detected operators, and
data type information detected from the input operand for the operators in the detection results;
an instruction code conversion step of converting the instruction codes produced in the computing expression expanding step into the object program, by converting and outputting:
instruction codes which specify a process of feeding block floating type data into a computing unit for performing a shifting process, if the input operand is block floating type data, based on at least one of the operational block scale factor and the block scale factor of an input operand, and
instruction codes which specify a process of calculating, if the input operand contain block floating type data, an operational block scale factor from the block scale factors of input data blocks.

2. The object program generating method according to claim 1, characterized in that:
the computing expression expanding step expands any block floating type data fed to a computing unit into instruction codes which specify a computational process based on the operators; and
the computing expression expanding step produces instruction codes which specify a data output process for calculating an interim block scale factor from the block scale factors of input data blocks, normalizing computational results which correspond to an output operand, and calculating block scale factors from the interim block scale factor if the output operand is block floating type data.

3. An object program generating method being able to perform block floating compiling process by using a Central Processing Unit (CPU) for translating a given source program into an object program by performing the block floating compiling process when the source program contains computing expressions which are written using block floating variables of a Block Floating data type in a storage device, characterized in that:
each of the block floating variables constitutes a data block containing one or more data groups, each of which in turn contains one or more data items and one group scale factor, the data block being a variable which represents a data structure containing a block scale factor of the data block, the block floating compiling process by using the CPU comprising:
a computing expression detecting step of detecting the computing expressions in the source program input from the storage device by detecting and outputting as detection results:
operators in the expressions,
the data type of input operand for the operators, and
the data type of output operand for the operators;
a computing expression expanding step of expanding the computing expressions detected in the computing expression detecting step into predetermined instruction codes, the expanding step based upon:
the detected operators, and
data type information detected from the input operand for the operators in the detection results;
an instruction code conversion step of converting the instruction codes produced in the computing expression expanding step into the object program, by converting and outputting:
instruction codes which specify a process of feeding block floating type data into a computing unit for performing a shifting process, if the input operand is block floating type data, based on at least one of the operational block scale factor and the block scale factor of an input operand, and
instruction codes which specify a process of calculating, if the input operand contain block floating type data, an operational block scale factor from the block scale factors of input data blocks.

4. The object program generating method according to claim 3, characterized in that:
the computing expression expanding step expands any block floating type data fed to a computing unit into instruction codes which specify a computational process based on the operators; and
the computing expression expanding step produces instruction codes which specify a data output process for calculating an interim block scale factor from the block scale factors of input data blocks, group-normalizing computational results which correspond to an output operand, calculating final group scale factors based on either or both of updated group scale factors calculated as a result of the group normalization and/or the interim block scale factor, and calculating a block scale factor from the calculated group scale factors if the output operand is block floating type data.

5. An object program generating method being able to perform block floating compiling process using a Central Processing Unit (CPU) for translating a given source program into an object program by performing the block floating compiling process when the source program contains computing expressions which are written using block floating variables in a storage device, characterized in that:
each of the block floating variables constitutes a data block containing one or more data items and the data block is a variable which represents a data structure containing a block scale factor of the data block, the block floating compiling process by using the CPU comprising:
a computing expression detecting step of detecting the computing expression input from the storage device detecting and outputting as detection results:
multiplication in the source program, and division in the source program,
a computing expression expanding step of expanding the computing expressions detected in the computing expression detecting step into predetermined instruction codes, the expanding step based upon the detected operators;
an instruction code embedding step of embedding the instruction codes produced in the computing expression expanding step in the object program;
at multiplication or division part of the computing expressions detected in the computing expression detecting step, the computing expression expanding step expands that part which involves multiplication or division into instruction codes which specify multiplication or division for data blocks corresponding to the block floating variables to be subjected to multiplication or division; and
the process specified by the instruction codes performs multiplication or division on data in the data blocks, produces the computational result as a computational-result data block, and calculates the block scale factor of the computational-result data block based on the block scale factors of the data blocks.

6. An object program generating method being able to perform block floating compiling process by using a Central Processing Unit (CPU) for translating a given source program into an object program by performing the block floating compiling process when the source program contains computing expressions which are written using block floating variables in a storage device, characterized in that:

each of the block floating variables constitutes a data block containing one or more data items and the data block is a variable which represents a data structure containing a block scale factor of the data block;

the block floating compiling process by using the CPU comprising:

a computing expression detecting step of detecting the computing expressions input from the storage device for detecting and outputting as detection results:
addition in the source program, and
subtraction in the source program, a computing expression expanding step of expanding the computing expressions detected in the computing expression detecting step into predetermined instruction codes, the expanding step based upon the detected operators, and an instruction code embedding step of embedding the instruction codes produced in the computing expression expanding step in the object program;

at addition or subtraction part of the computing expressions detected in the computing expression detecting step, the computing expression expanding step expands that part which involves addition or subtraction into instruction codes which specify addition or subtraction for data blocks corresponding to the block floating variables to be subjected to addition or subtraction; and the process specified by the instruction codes selects the block scale factor of the data block containing data with the maximum absolute value as a common block scale factor, scales data in the data blocks based on the common block scale factor, and performs addition or subtraction on the scaled data in the data blocks.

7. An object program generating method being able to perform block floating compiling process by using a Central Processing Unit (CPU) for translating a given source program into an object program by performing the block floating compiling process when the source program contains computing expressions which are written using block floating variables in a storage device, characterized in that:

each of the block floating variables constitutes a data block containing one or more data items and the data block is a variable which represents a data structure containing a block scale factor of the data block;

the block floating compiling process by using the CPU comprising:

a computing expression detecting step of detecting the computing expressions for multiplication-accumulation in the source program input from the storage device by a computing expression detecting means, a computing expression expanding step of expanding the computing expressions detected in the computing expression detecting step into predetermined instruction codes by a computing expression expanding means, and an instruction code embedding step of embedding the instruction codes produced in the computing expression expanding step in the object program by an instruction code embedding means;

at multiplication-accumulation part of the computing expressions detected in the computing expression detecting step, the computing expression expanding step expands that part which involves multiplication-accumulation into instruction codes which specify multiplication-accumulation for a first data block and second data block which correspond to two block floating variables to be subjected to multiplication and a third data block which corresponds to a block floating variable to be subjected to addition or subtraction; and the process specified by the instruction codes comprises a first scaling process for scaling data in the first data block based on a given scale factor, a second scaling process for scaling data in the third data block based on a given scale factor, a multiplication process for multiplying the second data block by the first data block from the first scaling process, and a computational process for performing addition or subtraction using the multiplication-result data block from the multiplication process and the third data block from the second scaling process further calculates a corrective block scale factor which is a difference between a multiplication-result block scale factor and the block scale factor of the third data block, the multiplication-result block scale factor being the sum of the block scale factors of the first data block and the second data block, and gives the corrective block scale factor to the first scaling process, feeds data from the first data block to the first scaling process, gives no scale factor to the second scaling process, and feeds data from the third data block to the second scaling process.

8. The object program generating method according to claim 7, characterized in that the process specified by the instruction codes performs either:

a first scale correction process for giving the corrective block scale factor to the first scaling process, feeding data from the first data block to the first scaling process, giving no scale factor to the second scaling process, and feeding data from the third data block to the second scaling process; or a second scale correction process for giving the corrective block scale factor to the second scaling process, feeding data from the third data block to the second scaling process, giving no scale factor to the first scaling process, and feeding data from the first data block to the first scaling process.

9. The object program generating method according to claim 7, characterized in that:

the process specified by the instruction codes selectively performs either the first scale correction process or the second scale correction process based on magnitude relation between the multiplication-result block scale factor and the block scale factor of the third data block.

10. The object program generating method according to claim 9, characterized in that:

the first scaling process shifts inputted data to lower-order bits by a shift amount equivalent to a given scale factor;

the second scaling process shifts inputted data to lower-order bits by a shift amount equivalent to a given scale factor; and the process specified by the instruction codes performs the first scale correction process when the block scale factor of the third data block is larger than the multiplication-result block scale factor, and performs the second scale correction process when the multiplication-result block scale factor is larger than the block scale factor of the third data block.

11. The object program generating method according to claim 9, characterized in that:

the first scaling process shifts inputted data to higher-order bits by a shift amount equivalent to a given scale factor;

the second scaling process shifts inputted data to higher-order bits by a shift amount equivalent to a given scale factor; and the process specified by the instruction codes performs the second scale correction process when the block scale factor of the third data block is larger than the multiplication-result block scale factor, and performs the first scale correction process when the multiplication-result block scale factor is larger than the block scale factor of the third data block.

* * * * *